(12) United States Patent
Wood et al.

(10) Patent No.: US 7,066,990 B2
(45) Date of Patent: Jun. 27, 2006

(54) INK JET INK AND RECORDING MATERIAL

(75) Inventors: Mervin G. Wood, Mobile, AL (US); Joseph Suhadolnik, Yorktown Heights, NY (US); Ramanathan Ravichandran, Suffern, NY (US); Sai P. Shum, Jamesburg, NJ (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/762,077

(22) Filed: Jan. 21, 2004

(65) Prior Publication Data

US 2004/0170779 A1 Sep. 2, 2004

Related U.S. Application Data

(60) Provisional application No. 60/443,503, filed on Jan. 29, 2003.

(51) Int. Cl.
 *C09D 11/02* (2006.01)
(52) U.S. Cl. .............................. 106/31.43; 106/31.46; 106/31.47; 106/31.49; 106/31.75; 106/31.76; 106/31.77; 106/31.78; 428/32.1
(58) Field of Classification Search ............ 106/31.43, 106/31.46, 31.47, 31.49, 31.75, 31.76, 31.77, 106/31.78; 428/32.1
See application file for complete search history.

(56) References Cited

U.S. PATENT DOCUMENTS

| 4,465,800 | A | * | 8/1984 | Bhatia ........................ 524/236 |
| 4,782,105 | A | * | 11/1988 | Ravichandran et al. ..... 524/236 |
| 4,898,901 | A | * | 2/1990 | Ravichandran et al. ..... 524/237 |
| 4,972,009 | A | * | 11/1990 | Suhadolnik et al. .......... 524/99 |
| 5,116,409 | A | | 5/1992 | Moffatt ........................ 106/22 |
| 5,226,957 | A | | 7/1993 | Wickramanayake et al. .. 106/25 |
| 5,607,987 | A | | 3/1997 | Winter et al. ................. 524/91 |
| 5,891,934 | A | | 4/1999 | Moffatt et al. .............. 523/161 |
| 6,102,997 | A | | 8/2000 | Helling et al. ............ 106/31.43 |
| 6,254,724 | B1 | * | 7/2001 | Seltzer et al. ................. 162/70 |
| 6,599,326 | B1 | | 7/2003 | Seltzer et al. ................... 8/101 |
| 6,676,735 | B1 | * | 1/2004 | Oki et al. ................. 106/31.46 |
| 6,811,597 | B1 | * | 11/2004 | Oki et al. ................. 106/31.46 |
| 2002/0050226 | A1 | | 5/2002 | Oki et al. ................. 106/31.46 |
| 2002/0088574 | A1 | | 7/2002 | Seltzer et al. ................. 162/72 |
| 2002/0174964 | A1 | | 11/2002 | Seltzer et al. ............... 162/158 |
| 2003/0070582 | A1 | * | 4/2003 | Kitamura et al. ......... 106/31.46 |
| 2003/0096993 | A1 | * | 5/2003 | Hayoz ........................ 544/215 |
| 2004/0011249 | A1 | * | 1/2004 | Oki et al. ................. 106/31.46 |
| 2004/0074417 | A1 | * | 4/2004 | Biry ........................ 106/31.01 |
| 2004/0126510 | A1 | * | 7/2004 | Wood et al. ............... 428/32.1 |
| 2004/0192684 | A1 | * | 9/2004 | Ravichandran et al. .. 514/230.5 |
| 2004/0210056 | A1 | * | 10/2004 | Wood et al. ................ 546/216 |

FOREIGN PATENT DOCUMENTS

| EP | 0884640 | 12/1998 |
| EP | 0924272 | 6/1999 |
| JP | 05239389 | 9/1993 |
| JP | 99170686 | 6/1999 |
| JP | 11348418 | 12/1999 |
| JP | 2000044851 | 2/2000 |
| JP | 2000062310 | 2/2000 |
| WO | 02/055618 | 7/2002 |

OTHER PUBLICATIONS

Patent Abstracts of Japan Publication No. 05239389, Sep. 1993.
English language abstract for JP 2000044851, Feb. 2000.
English language abstract for JP 2000062310, Feb. 2000.
English language abstract for JP 11348418, Dec. 1999.

* cited by examiner

*Primary Examiner*—Helene Klemanski
(74) *Attorney, Agent, or Firm*—Tyler A. Stevenson

(57) ABSTRACT

The present invention relates to an ink jet ink, an ink jet recording material or an ink jet system comprising at least one compound selected from the group consisting of a) the dialkyl hydroxylamine stabilizers, b) the nitrone stabilizers and c) the amine oxide stabilizers. The present stabilizer compounds provide ink jet prints with outstanding light stability, gas fade stability and dark storage stability. The hydroxylamines are for example N,N-dihydrocarbylhydroxylamines of the formula $R_1R_2N$—OH, wherein $R_1$ and $R_2$ are independently benzyl, methyl, ethyl, octyl, lauryl, dodecyl, tetradecyl, hexadecyl, heptadecyl or octadecyl, or wherein $R_1$ and $R_2$ are each the alkyl mixture found in hydrogenated tallow amine. The nitrone and amine oxide stabilizers are for example nitrone and amine oxide analogues of the dialkylhydroxylamine stabilizers.

28 Claims, No Drawings

INK JET INK AND RECORDING MATERIAL

This application claims priority under 35 U.S.C 119(e) of U.S. provisional application No. 60/443,503, filed Jan. 29, 2003.

The present invention relates to an ink jet ink, an ink jet recording material or an ink jet system with improved properties.

In the ink jet process, an image is produced by ejecting ink droplets onto a recording material through a nozzle. The ink is in most cases an aqueous solution of a dye. The recording material should rapidly and permanently fix the said dye. Specially prepared papers or plastic films provided with a dye binding layer are mostly used for this purpose. Owing to the fineness of the nozzles, dyes which are completely dissolved in the ink vehicle are preferred to pigments. Besides, dyes offer a higher chroma and a better color gamut when compared to pigments. However, ink jet dyes usually have a poorer fastness to light than, for example, the colored pigments customary in conventional printing inks. As a result, images produced by ink jet printing usually have a limited lifetime when subjected to light and thus rapidly begin to fade or discolor.

The use of water insoluble hindered amine compounds in ink jet ink or media has been reported in e.g. JP2000062310, JP05239389 and JP11348418.

JP2000044851 teaches an ink composition that contains certain hindered amine compounds.

U.S. Pat. No. 6,102,997 describes an ink jet system that comprises certain amine compounds.

JP99170686 teaches hindered amine type additives generically in the ink receiving layer of ink jet recording media.

U.S. application Ser. No. 20020050226 discloses aqueous ink compositions comprising hindered amine derivatives.

EP884640 teaches the use of certain N,N-dialkylhydroxylamine derivatives as antioxidants in photographic color developer compositions.

W002/055618 teaches ink jet inks or ink jet recording materials that comprise hydroxylamine salt compounds.

It has now been found that certain dialkyl hydroxylamine compounds and certain nitrone compounds provide ink jet prints with outstanding permanence. The dialkyl hydroxylamines and nitrones provide outstanding light stability, gas fade stability and dark storage stability.

Gas fade stability refers to stability against exposure to ozone, singlet oxygen and other airborne pollutants such as NOX, SOX, etc.

The present invention therefore relates to an ink jet ink or ink jet recording material comprising at least one compound selected from the group consisting of
 a) the dialkyl hydroxylamine stabilizers,
 b) the nitrone stabilizers and
 c) the amine oxide stabilizers.

Dialkylhydroxylamine stabilizers, for example N,N,-dialkylhydroxylamines and N,N-dibenzylhydroxylamine, are well known as useful stabilizers for a variety of polymeric substrates as is taught for example in U.S. patent application Ser. No. 874,211 filed Jun. 13, 1997 (EP884640) and U.S. Pat. Nos. 4,590,231, 4,668,721, 4,782,105, 4,876,300 and 5,013,510, the relevant parts of which are incorporated herein by reference.

U.S. Pat. Nos. 4,649,221 and 4,703,073 teach the use of polyhydroxylamine compounds and alkylated N,N-dibenzylhydroxylamine derivatives, respectively, towards stabilizing polyolefins. The disclosures of these U.S. Patents are also hereby incorporated by reference.

Ester, amide or thio substituted N,N-dialkylhydroxylamines are described in U.S. Pat. Nos. 4,612,393, 4,720, 517, 4,668,727 and 5,019,285, the relevant disclosures of which are also hereby incorporated by reference.

For example, the present dialkylhydroxylamine stabilizers are those disclosed in the above mentioned U.S. Patents, and are for instance of the formula

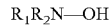

where
$R_1$ is alkyl of 1 to 36 carbon atoms, cycloalkyl of 5 to 12 carbon atoms or aralkyl of 7 to 9 carbon atoms; or $R_1$ is said alkyl, cycloalkyl or aralkyl substituted by one to six alkyl of 1 to 12 carbon atoms, perfluoroalkyl of 1 to 12 carbons atoms, halogen, cyano, $E_1O$—, $E_1CO$—, $E_1OCO$—, $M^+O^-CO$—, $E_1COO$—, $E_1S$—, $E_1SO$—, $E_1SO_2$—, —$NH_2$, —$NHE_1$, —$NE_1E_2$, —$PO(OE_1)(OE_2)$ or —$OPO(OE_1)(OE_2)$ groups;

$R_2$ is hydrogen or independently has the same meaning as $R_1$, where at least one of $R_1$ and $R_2$ contains a hydrogen alpha to the —NOH moiety; or $R_1$ and $R_2$ together form a $C_{2-12}$heterocyclic ring which contains at least one carbon substituted hydrogen alpha to the —NOH moiety, where said $C_{2-12}$heterocyclic ring is unsubstituted or is substituted by one to three three alkyl of 1 to 12 carbon atoms, perfluoroalkyl of 1 to 12 carbon atoms, halogen, cyano, $E_1CO$—, $E_1CO$—, $E_1OCO$—, $M^+O^-CO$—, $E_1COO$—, $E_1S$—, $E_1SO$—, $E_1SO_2$—, —$NH_2$, —$NE_1E_2$, —$PO(OE_1)(OE_2)$ or —$OPO(OE_1)(OE_2)$ groups; or where said $C_{2-12}$heterocyclic ring is interrupted by one to three —O—, —$NE_1$—, —CO—, —$CONE_1$—, —S—, —SO—, —$SO_2$—, —COO—, —$PO_3$— or —$PO_4E_1$ groups; or where said heterocyclic ring is both substituted and interrupted by said groups;

$M^+$ is a mono-, di- or tri-valent metal cation;

$E_1$ and $E_2$ independently are hydrogen, alkyl of 1 to 8 carbon atoms or alkyl of 1 to 8 carbon atoms substituted by one to three hydroxyl groups; or $E_1$ and $E_2$ independently are an oligomer of poly(ethylene glycol) or poly(propylene glycol) terminated by hydroxyl, methoxy, acetate or propionate, where the oligomer has a molecular weight up to about 500.

The phrase "where at least one of $R_1$ and $R_2$ contains a hydrogen alpha to the —NOH moiety" means that the present dialkylhydroxylamines are not di-tert-alkylhydroxylamines.

The present dialkylhydroxylamine stabilizers are, for example, N,N-dihydrocarbylhydroxylamines wherein $R_1$ and $R_2$ are independently benzyl, methyl, ethyl, octyl, lauryl, dodecyl, tetradecyl, hexadecyl, heptadecyl or octadecyl, or wherein $R_1$ and $R_2$ are each the alkyl mixture found in hydrogenated tallow amine.

The present hydroxylamine stabilizers are, for example, N,N-dihydrocarbylhydroxylamines selected from the group consisting of N,N-dibenzylhydroxylamine, N,N-dimethylhydroxylamine, N,N-diethylhydroxylamine, N,N-bis(2-hydroxypropyl)hydroxylamine, N,N-bis(3-hydroxypropyl)hydroxylamine, N,N-bis(2-carboxy-ethyl)hydroxylamine, N,N-bis(benzylthiomethyl)hydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine, N,N-di(hydrogenated tallow)hydroxylamine,

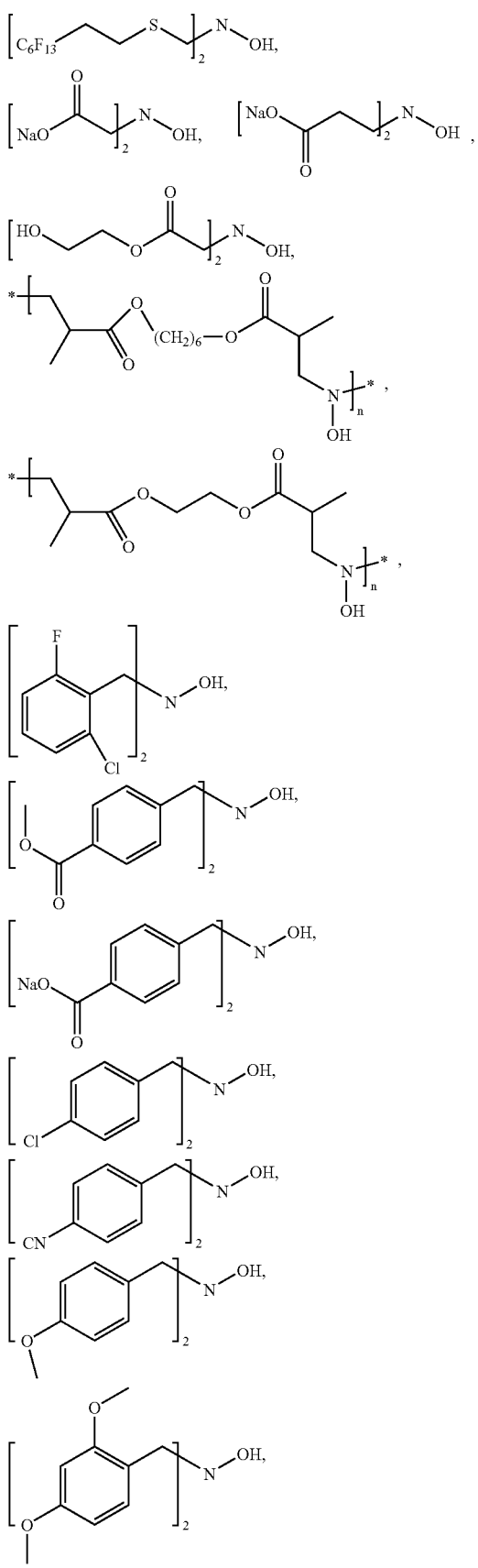

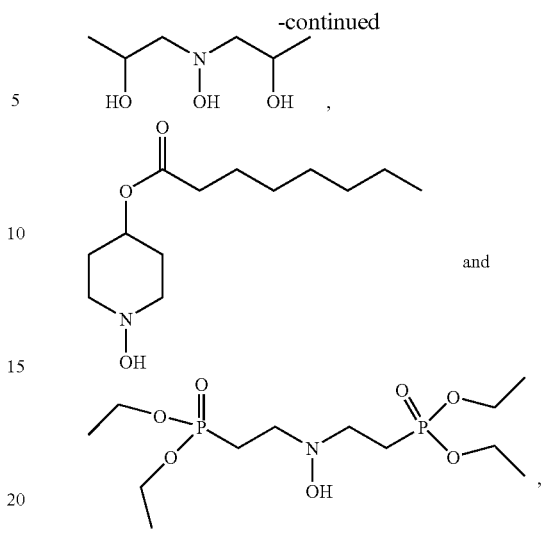

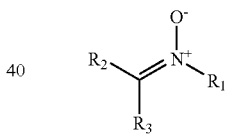

where n=2 to 200.

For example, the present hydroxylamine stabilizer is N,N-diethylhydroxylamine, N,N-bis(2-hydroxypropyl)hydroxylamine, N,N-bis(3-hydroxypropyl)hydroxylamine or N,N-dibenzyl-hydroxylamine.

The present hydroxylamine stabilizer is for example the N,N-di(alkyl)hydroxylamine produced by the direct oxidation of N,N-di(hydrogenated tallow)amine.

The nitrones of the present invention are for example as described in U.S. Pat. Nos. 4,898,901 and 4,972,009, the disclosures of which are hereby incorporated by reference.

The nitrone stabilizers are for example of the formula $$R_2 \underset{R_3}{\overset{}{\diagdown}} \text{C} = \overset{O^-}{\underset{}{\overset{+}{N}}} - R_1$$

wherein $R_1$ is alkyl of 1 to 36 carbon atoms, cycloalkyl of 5 to 12 carbon atoms or aralkyl of 7 to 9 carbon atoms; or $R_1$ is said alkyl, cycloalkyl or aralkyl substituted by one to six alkyl of 1 to 12 carbon atoms, perfluoroalkyl of 1 to 12 carbon atoms, halogen, cyano, $E_1O$—, $E_1CO$—, $M^+O^-CO$—, $E_1OCO$—, $E_1COO$—, $E_1S$—, $E_1SO$—, $E_1SO_2$—, —$NH_2$, —$NHE_1$, —$NE_1E_2$, —$PO(OE_1)(OE_2)$ or —$OPO(OE_1)(OE_2)$ groups;

$R_2$ is hydrogen or independently has the same meaning as $R_1$; or $R_1$ and $R_2$ together form a $C_{2-12}$heterocyclic ring which is unsubstituted or is substituted by one to three three alkyl of 1 to 12 carbon atoms, perfluoroalkyl of 1 to 12 carbon atoms, halogen, cyano, $E_1O$—, $E_1CO$—, $M^+O^-CO$—, $E_1OCO$—, $E_1COO$—, $E_1S$—, $E_1SO$—, $E_1SO_2$—, —$NH_2$, —$NHE_1$, —$NE_1E_2$, —$PO(OE_1)(OE_2)$ or —$OPO(OE_1)(OE_2)$ groups; or where said $C_{2-12}$heterocyclic ring is interrupted by one to three —O—, —$NE_1$—, —CO—, —$CONE_1$—, —S—, —SO—, —$SO_2$—, —COO—, —$PO_3$— or —$PO_4E_1$ groups; or where said heterocyclic ring is both substituted and interrupted by said groups;

$E_1$ and $E_2$ independently are hydrogen, alkyl of 1 to 8 carbon atoms or alkyl of 1 to 8 carbon atoms substituted by one to three hydroxyl groups; or $E_1$ and $E_2$ independently are an oligomer of poly(ethylene glycol) or poly(propylene glycol) terminated by hydroxyl, methoxy, acetate or propionate, where the oligomer has a molecular weight up to about 500; and $R_3$ independently has the same meaning as $R_1$;

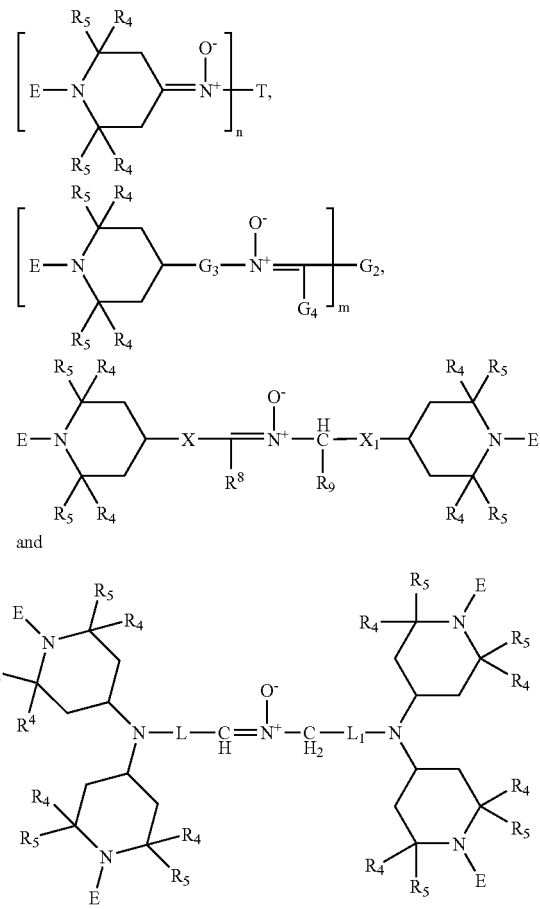

and

E is hydrogen, oxyl, hydroxyl, alkyl of 1 to 18 carbon atoms, alkenyl of 3 to 18 carbon atoms, cycloalkyl of 5 to 12 carbon atoms, hydroxyalkyl of 2 to 6 carbon atoms, alkoxyalkyl of 2 to 20 carbon atoms, alkanoyl of 1 to 18 carbon atoms, alkoxy of 1 to 18 carbon atoms, cycloalkoxy of 5 to 12 carbon atoms, aryloxy of 6 to 10 carbon atoms, hydroxyalkoxy of 2 to 6 carbon atoms, alkoxyalkoxy of 2 to 20 carbon atoms, aralkoxy of 7 to 15 carbon atoms or a bicyclo or tricycloaliphatic oxy radical of 7 to 12 carbon atoms, $R_4$ and $R_5$ are independently alkyl of 1 to 4 carbon atoms or together $R_3$ and $R_4$ are pentamethylene, n is 1, 2, 3 or 4, when n is 1, T is alkyl of 1 to 36 carbon atoms, cycloalkyl of 5 to 12 carbon atoms, aralkyl of 7 to 9 carbon atoms or aralkyl of 7 to 9 carbon atoms substituted by alkyl of 1 to 4 carbon atoms or by one or two halogen atoms, said alkyl interrupted by one or more oxygen atoms, cyanoethyl, alkenyl of 3 to 8 carbon atoms, alkoxycarbonylalkyl of 4 to 36 carbon atoms where alkyl is of 1 to 4 carbon atoms, when n is 2, T is alkylene of 2 to 12 carbon atoms, arylene of 6 to 10 carbon atoms, xylylene, —$CH_2CHOHCH_2$—, $CH_2CHOHCH_2$—O—$G_1$—O—$CH_2CHOHCH_2$—, —$CH_2$-phenylene-COO—$G_1$—OCO-phenylene-$CH_2$— or —$CH_2$-phenylene-$CH_2$—OCO—$G_1$—COO—$CH_2$-phenylene-$CH_2$—, $G_1$ is alkylene of 2 to 12 carbon atoms, arylene of 6 to 10 carbon atoms or cycloalkylene of 6 to 12 carbon atoms, when n is 3, T is alkanetriyl of 3 to 6 carbon atoms, or is

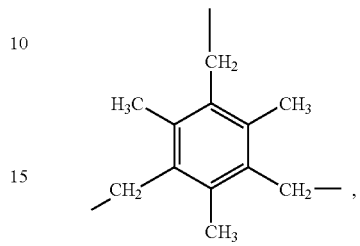

and when n is 4, T is alkanetetrayl of 4 to 6 carbon atoms, $G_3$ is a direct bond, —OCO—$(C_qH_{2q})_q$—, —OCO-phenylene-$CH_2$—, —$NG_4$—CO—$(C_qH_{2q})_q$— or —$NG_4$—CO-phenylene-$CH_2$— where q is 1 to 12, $G_4$ is hydrogen, alkyl of 1 to 8 carbon atoms or phenyl, m is 1 or 2, when m is 1, $G_2$ is alkyl of 1 to 36 carbon atoms, said alkyl interrupted by one or more oxygen atoms, cyanomethyl, cycloalkyl of 6 to 8 carbon atoms, alkenyl of 2 to 8 carbon atoms, aryl of 6 to 10 carbon atoms, or aryl of 6 to 10 carbon atoms substituted by alkyl of 1 to 4 carbon atoms or by one or two halogen atoms, or alkoxycarbonylalkyl of 4 to 36 carbon atoms where alkyl is of 1 to 4 carbon atoms, and when m is 2, $G_2$ is alkylene of 2 to 12 carbon atoms or arylene of 6 to 10 carbon atoms, X and $X_1$ are independently Q—G, where Q is —O—, —COO—, —OCO— or —$NR_6$—, $R_6$ is hydrogen, alkyl of 1 to 8 carbon atoms, cycloalkyl of 5 to 12 carbon atoms, cyanoethyl, aryl of 6 to 10 carbon atoms, aralkyl of 7 to 15 carbon atoms or —$CH_2CHR_7OH$, and $R_7$ is hydrogen, methyl or phenyl, with Q being attached to the piperidinyl ring, G is alkylene of 1 to 4 carbon atoms, arylene of 6 to 10 carbon atoms or arylene-alkylene of 7 to 15 carbon atoms, $R_8$ and $R_9$ are independently hydrogen or alkyl of 1 to 8 carbon atoms, and L and $L_1$ are independently —CO-alkylene of 2 to 5 carbon atoms or —CO-phenylene- with the carbonyl group being attached to the N atom.

Preferably E is hydrogen, hydroxyl, alkyl of 1 to 12 carbon atoms, alkyl, benzyl, alkanoyl of 2 to 4 carbon atoms, alkoxy of 1 to 12 carbon atoms, cyclohexyloxy or alpha-methylbenzyloxy.

Most preferably E is hydrogen, hydroxyl, alkyl of 1 to 4 carbon atoms, alkyl, benzyl, acetyl, methoxy, heptyloxy, octyloxy, nonyloxy or cyclohexyloxy.

$R_4$ and $R_5$ are preferably each methyl.

When n is 1, T is preferably alkyl of 1 to 18 carbon atoms, benzyl or alkoxycarbonylalkyl of 4 to 18 carbon atoms where the alkyl is of 2 to 4 carbon atoms.

Most preferably, when n is 1, T is alkyl of 1 to 12 carbon atoms, benzyl or alkoxycarbonylethyl of 4 to 15 carbon atoms.

When n is 2, T is preferably alkylene of 2 to 8 carbon atoms or p-xylylene.

Most preferably, when n is 2, T is alkylene of 4 to 8 carbon atoms.

Preferably, when n is 3, T is glyceryl.

When n is 4, T is preferably pentaerythrityl.

$G_3$ is preferably a direct bond

Preferably $G_4$ is hydrogen.

Preferably when m is 1, $G_2$ is alkyl of 1 to 12 carbon atoms or phenyl.

Preferably when m is 2, $G_2$ is alkylene of 3 to 8 carbon atoms or phenylene.

Preferably X and $X_1$, are the same.

$R_8$ and $R_9$ are preferably hydrogen.

Preferably L and $L_1$ are the same and are —CO—CH$_2$— or —CO-phenylene-.

The nitrones are for example the corresponding oxidation products of hydroxylamine stabilizers. That is to say, the nitrones may be nitrone analogues of hydroxylamine stabilizers. The nitrones may be for example, N-benzyl-α-phenylnitrone, N-ethyl-α-methylnitrone, N-octyl-α-heptylnitrone, N-lauryl-α-undecylnitrone, N-tetradecyl-α-tridcylnitrone, N-hexadecyl-α-pentadecylnitrone, N-octadecyl-α-heptadecylnitrone, N-hexadecyl-α-heptadecylnitrone, N-ocatadecyl-α-pentadecylnitrone, N-heptadecyl-α-heptadecylnitrone, N-octadecyl-α-hexadecylnitrone, N-methyl-α-heptadecylnitrone, the nitrone derived from N,N-di(hydrogenated tallow)hydroxylamine, N-benzyl-α-methylnitrone, N-butyl-α-propylnitrone,

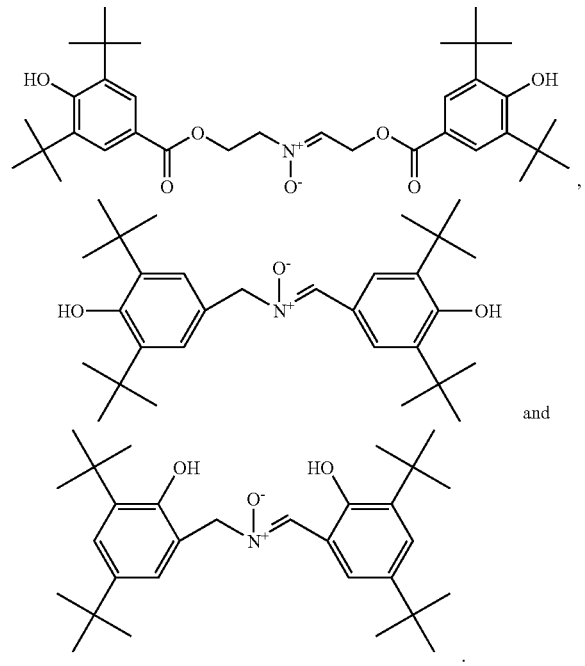

Other suitable present nitrones are for example α-phenyl-N-(2,2,6,6-tetramethylpiperidin-4-yl)nitrone, α-phenyl-N-(1,2,2,6,6-pentamethylpiperidin-4-yl)nitrone, α-phenyl -N-(1-cyclohexyloxy-2,2,6,6-tetramethylpiperidin-4yl)nitrone, α-phenyl-N-(1-octyloxy-2,2,6,6-tetramethylpiperidin-4yl) nitrone, α,α'-p-phenylene-N,N'-bis[(2,2,6,6-tetramethylpiperidin-4-yl)nitrone], N-benzyl-N-(1-cyclohexyloxy-2,2,6,6-tetramethylpiperidin-4-ylidene)amine-N -oxide, α-n-propyl-N-(1-cyclohexyloxy-2,2,6,6-tetramethylpiperidin-4-yl)nitrone, α-isopropyl-N-(1-octyloxy-2,2,6,6-tetramethylpiperidin-4-yl)nitrone, α,α'-tetramethylene-N, N'-bis[(1-octyloxy-2,2,6,6-tetramethylpiperidin-4-yl) nitrone], α-n-propyl-N-(1-acetyl-2,2,6,6-tetramethylpiperidin-4-yl)nitrone and α-[4-(1-cyclohexyloxy-2,2,6,6-tetramethylpiperidin-4-yloxycarbonyl)-phenyl]-N-[4-(1-cyclohexyloxy-2,2,6,6-tetramethyl-piperidin-4-yloxycarbonyl)benzyl]nitrone.

The amine oxide stabilizers are for example those disclosed in U.S. Pat. Nos. 5,081,300, 5,162,408, 5,844,029, 5,880,191 and 5,922,794, the relevant parts of each incorporated herein by reference.

The amine oxide stabilizers are for example saturated tertiary amine oxides as represented by the formula:

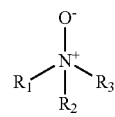

wherein $R_1$ is alkyl of 1 to 36 carbon atoms, cycloalkyl of 5 to 12 carbon atoms or aralkyl of 7 to 9 carbon atoms; or $R_1$ is said alkyl, cycloalkyl or aralkyl substituted by one to six alkyl of 1 to 12 carbon atoms, perfluoroalkyl of 1 to 12 carbon atoms, halogen, cyano, $E_1O$—, $E_1CO$—, $M^+O^-CO$—, $E_1OCO$—, $E_1COO$—, $E_1S$—, $E_1SO$—, $E_1SO_2$—, —$NH_2$, —$NHE_1$, —$NE_1E_2$, —$PO(OE_1)(OE_2)$ or —$OPO(OE_1)(OE_2)$ groups;

$R_2$ is hydrogen or independently has the same meaning as $R_1$; or $R_1$ and $R_2$ together form a $C_{2-12}$heterocyclic ring which is unsubstituted or is substituted by one to three three alkyl of 1 to 12 carbon atoms, perfluoroalkyl of 1 to 12 carbon atoms, halogen, cyano, $E_1O$—, $E_1CO$—, $M^+O^-CO$—, $E_1OCO$—, $E_1COO$—, $E_1S$—, $E_1SO$—, $E_1SO_2$—, —$NH_2$, —$NHE_1$, —$NE_1E_2$, —$PO(OE_1)(OE_2)$ or —$OPO(OE_1)(OE_2)$ groups; or where said $C_{2-12}$heterocyclic ring is interrupted by one to three —O—, —$NE_1$—, —CO—, —$CONE_1$—, —S—, —SO—, —$SO_2$—, —COO—, —$PO_3$— or —$PO_4E_1$ groups; or where said heterocyclic ring is both substituted and interrupted by said groups;

$E_1$ and $E_2$ independently are hydrogen, alkyl of 1 to 8 carbon atoms or alkyl of 1 to 8 carbon atoms substituted by one to three hydroxyl groups; or $E_1$ and $E_2$ independently are an oligomer of poly(ethylene glycol) or poly(propylene glycol) terminated by hydroxyl, methoxy, acetate or propionate, where the oligomer has a molecular weight up to about 500; and $R_3$ independently has the same meaning as $R_1$;

wherein at least one of $R_1$, $R_2$ and $R_3$ contains a β carbon-hydrogen bond.

Examples of amine oxide stabilizers are where $R_1$ and $R_2$ are independently benzyl or substituted benzyl. It is also possible for each of $R_1$, $R_2$, and $R_3$ to be the same residue. $R_1$ and $R_2$ may also independently be alkyl groups of 8 to 26 carbon atoms, for example alkyl groups of 10 to 26 carbon atoms. $R_3$ may be an alkyl group of 1 to 22 carbon atoms, for example methyl or substituted methyl. Also, the present amine oxides include those wherein $R_1$, $R_2$, and $R_3$ are the same alkyl groups of 6 to 36 carbon atoms.

The amine oxide stabilizer is for example Genox™EP, a di($C_{16}$–$C_{18}$)alkyl methyl amine oxide, CAS# 204933-93-7.

Alkyl and alkylene groups embrace both straight and branched chain moieties.

Alkyl is branched or unbranched, and is for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, iso-heptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl or docosyl.

Perfluoroalkyl is for example trifluoromethyl of —$C_6F_{13}$.

Cycloalkyl is, for example, cyclopentyl, methylcyclopentyl, dimethylcyclopentyl, cyclohexyl, methylcyclohexyl, dimethylcyclohexyl, trimethylcyclohexyl, tert-butylcyclohexyl, cycloheptyl or cyclooctyl.

Aralkyl is for example benzyl, alpha-methylbenzyl, alpha,alpha-dimethylbenzyl or 2-phenylethyl.

Alkylene is, for example, methylene, ethylene, propylene, trimethylene, tetramethylene, neopentanediyl, hexamethylene, octamethylene or dodecamethylene.

Examples of other groups include the following. If applicable, each group is straight chain or is branched:

alkenyl-allyl, but-2-enyl, oleyl;

hydroxyalkyl-2-hydroxyethyl, 2-hydroxypropyl, 3-hydroxypropyl;

alkanoyl-formyl, acetyl, propionyl, butyryl, valeroyl, caproyl, lauroyl, stearoyl;

alkoxy-methoxy, amyloxy, heptyloxy, octyloxy, nonyloxy, dodecyloxy;

arylene-o-phenylene, m-phenylene, p-phenylene, naphthylene;

xylylene-o-xylylene, m-xylylene, p-xylylene;

alkanetriyl-glyceryl, 1,2,4-butanetriyl, 1,2,6-hexanetriyl, 2-ethyl-isobutanetriyl; and alkanetetrayl-pentaerythrityl, 1,2,3,4-butanetetrayl.

Where the term phenylene appears in structures of this invention, it relates to o-phenylene, m-phenylene or p-phenylene, preferably p-phenylene.

Mono-, di- or tri-valent metal cation is preferably an alkali metal cation, alkaline earth metal cation or aluminium cation, for example $Na^+$, $K^+$, $Mg^{++}$, $Ca^{++}$ or $Al^{+++}$.

$C_{2-12}$heterocyclic rings are for example 5- or 6-membered rings such as

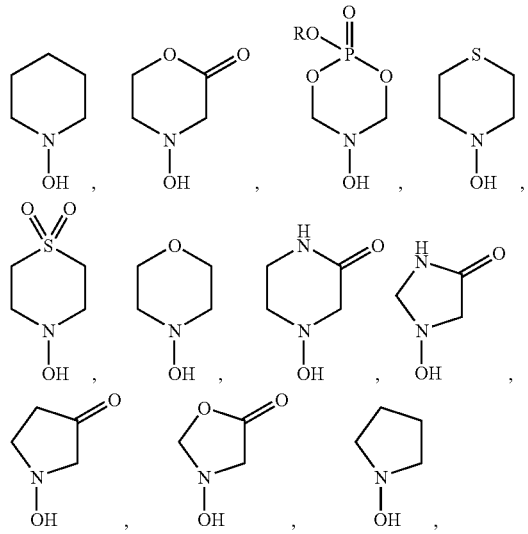

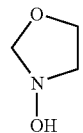

and the like.

The compositions and processes of this invention may employ any combination of components a), b) and c) or, alternatively, may comprise only component a) or only component b) or only component c).

Furthermore, the invention relates to an ink jet system, comprising a recording material and at least one colored ink to be applied to the recording material by means of an ink jet nozzle, wherein at least either the recording material or at least one colored ink comprises at least one compound selected from the group consisting of a) the dialkyl hydroxylamine stabilizers, b) the nitrone stabilizers and c) the amine oxide stabilizers.

Furthermore, the invention relates to a process for stabilizing ink jet prints which comprises applying to a recording material for ink jet printing an ink composition comprising a water soluble dye or a solution of a dye in an organic solvent and at least one compound selected from the group consisting of a) the dialkyl hydroxylamine stabilizers, b) the nitrone stabilizers and c) the amine oxide stabilizers and drying said recording material.

In another embodiment the process for stabilizing ink jet prints comprises applying to a recording material for ink jet printing a casting or coating dispersion or an aqueous or organic solution comprising at least one compound selected from the group consisting of a) the dialkyl hydroxylamine stabilizers, b) the nitrone stabilizers and c) the amine oxide stabilizers and further applying either an ink composition comprising a water soluble dye or a solution of a dye in an organic solvent; or an ink composition comprising a water soluble dye or a solution of a dye in an organic solvent and at least one compound selected from the group consisting of components a), b) and c) and drying said recording material.

The present hydroxylamine stabilizers, nitrone stabilizers and amine oxide stabilizers are used either in the ink jet recording material or in at least one ink jet ink or in both.

The ink jet ink according to this invention comprises about 0.01 to about 30% by weight, for example about 0.1 to about 20% by weight, of at least one compound selected from the group consisting of components a), b) and c), based on the weight of the ink jet ink.

The ink jet recording material according to this invention comprises about 1 to about 10000 mg/m$^2$, for example about 50 to about 2000 mg/m$^2$, of at least one compound selected from the group consisting of components a), b) and c).

The present stabilizers are preferably added to casting or coating dispersions which are applied by customary techniques to the support of the ink jet recording material, or they can be absorbed onto the material from an aqueous or organic solution. If the recording material contains more than one layer, the compounds according to this invention can be added to one layer or can be distributed over a plurality of layers, wherein they can be applied to a plurality of layers in the same or different concentrations.

The present stabilizers are preferably used in ink jet inks or recording materials, but may also be incorporated in ink compositions for felt-tipped pens, ink pads, fountain pens, and pen plotters, as well as for offset, book, flexographic and intaglio printing, and also for typewriter ribbons for dot matrix and calligraphic printing. The dialkylhydroxylamines and nitrones can further be used in silver halide photographic materials as well as in recording materials for pressure-sensitive copying systems, microcapsule photocopier systems, heat-sensitive copier systems, dye diffusion transfer printing, thermal wax transfer printing and dot matrix printing, and for use with electrostatic, electrographic, electrophoretic, magnetographic and laser-electrophotographic printers, recorders or plotters.

Amongst the printers used for ink jet printing, a distinction is usually made between continuous and drop-on-demand printers. The ink jet system according to this invention is suited for use with both type of printers.

The ink compositions according to the novel ink jet system are preferably water-borne inks and may contain water-soluble solvents such as ethylene glycol, diethylene glycol, triethylene glycol or higher ethylene glycols, propylene glycol, 1,4-butanediol, or ethers of such glycols, thiodiglycol, glycerol and the ethers and esters thereof, polyglycerol, mono-, di- and triethanolamine, propanolamine, dimethyl formamide, dimethyl sulfoxide, dimethyl acetamide, N-methylpyrrolidone, 1,3-dimethylimidazolidone, methanol, ethanol, isopropanol, n-propanol, diacetone alcohol, acetone, methyl ethyl ketone or propylene carbonate.

The ink compositions according to the novel ink jet system preferably contain water soluble dyes, such as those known for dyeing natural fibres. These can, for example, be acid dyes, direct dyes, reactive dyes, mono-, di- or polyazo dyes, triphenylmethane dyes, xanthene dyes or phtalocyanine dyes. Specific examples of such dyes are Food Black 2, Direct Black 19, Direct Black 38, Direct Black 168, Sulphur Black 1, Acid Red 14, Acid Red 35, Acid Red 52, Acid Red 249, Direct Red 227, Reactive Red 24, Reactive Red 40, Reactive Red 120, Reactive Red 159, Reactive Red 180, Acid Yellow 17, Acid Yellow 23, Direct Yellow 86, Direct Yellow 132, Acid blue 9, Acid Blue 185, Direct Blue 86, Direct Blue 199, copper phtalocyanines and the azo dyes listed in EP-A-366 221.

The ink compositions according to the invention may be nonaqueous and consist of a solution of dyes in an organic solvent or a mixture of organic solvents. Examples of solvents used for this purpose are alkyl carbitols, alkylcellosolves, dialkylformamides, dialkylacetamides, alcohols, acetone, methylethylketone, diethylketone, diethyl ketone, methyl isobutyl ketone, diisopropyl ketone, dibutyl ketone, dioxane, ethyl butyrate, ethyl isovalerate, diethyl malonate, diethyl succinate, butyl acetate, triethyl phosphate, ethylglycol acetate, toluene, xylene, tetralin or petroleum fractions. Example of solid waxes as solvents, which, as an ink carrier, must first be heated, are stearic or palmitic acid. Solvent based inks contain dyes soluble therein, for example Solvent Red, Solvent Yellow, Solvent Orange, Solvent Blue, Solvent Green, Solvent Violet, Solvent Brown or Solvent Black.

The ink compositions according to the novel ink jet system may also contain minor amounts of conventional modifiers such as binders, surfactants, biocides, corrosion inhibitors, sequestrants, pH buffers or conductivity additives. They may also contain further light stabilizers or UV absorbers, including the compounds disclosed in U.S. Pat. Nos. 5,073,448, 5,089,050, 5,096,489, 5,124,723, 5,098,477 and 5,509,957.

The ink compositions according to the invention may also consist of more than one phase. Ink compositions that consist of an aqueous phase in which the dye is dissolved and a dispersed oil phase that contains an UV absorber and/or an antioxidant are for example disclosed in JP-A-01170 675, JP-A-01182 379, JP-A-01182 380, JP-A-01182 381, JP-A-01193 376. Oil soluble dyes can be dissolved in an oil together with UV absorbers and/or antioxidants. The oil is either emulsified or dispersed in an aqueous phase as described, inter alia, in JP-A-01 170674 and JP-A-01 170672.

Further suited ink jet ink compositions are described in EP-A-672 538, pages 3 to 6.

The recording materials according to the novel ink jet system consist of a substrate having a surface which is printable by means of an ink jet. The substrate is usually plain paper or polyolefin-laminated paper or a plastic sheet and is usually coated with at least one layer which is able to absorb ink. The substrate preferably has a thickness of 80 to 250 μm.

Uncoated paper might also be used. In this case, the paper acts simultaneously as substrate and ink absorbing layer. Materials made of cellulosic fibers and textile fibers materials such as cotton fabrics or blends of cotton and polyacrylamide or polyester, which might contain the present stabilizers, can also be used as printing materials.

The recording materials may also be transparent, as in the case of overhead projection transparencies.

The present stabilizers can be incorporated in the substrate during production thereof, conveniently by addition to the pulp during paper manufacture. Another method of application consists in spraying the substrate with a solution of the present stabilizers in water or in a readily volatile organic solvent. The use of emulsions or dispersions is also possible.

Usually, however, at least one coating composition with high dye affinity is coated onto the substrate and, in this case, the present stabilizers are added to at least one of the said coating compositions. Typical coating compositions comprise, for example, a solid filler, a binder and conventional additives.

Example of suitable fillers are $SiO_2$, kaolin, talc, clay, calcium silicate, magnesium silicate, aluminium silicate, gypsum, zeolites, bentonite, diatomaceous earth, vermiculite, starch or the surface modified $SiO_2$ described in JP-A-60 260 377. Small amounts of white pigments, for example titanium dioxide, barytes, magnesium oxide, lime, chalk or magnesium carbonate, can be used with the filler in the coating composition, provided they do not significantly lower the print density of the ink jet prints.

The present stabilizers may advantageously be employed in a nanoporous or microporous ink jet material.

Coating compositions which are intended for transparent, projectable recording materials must not contain any light-scattering particles, such as pigments and fillers.

The binder binds the fillers to one another and to the substrate. Typical conventional binders are water-soluble polymers such as polyvinyl alcohol, partially hydrolysed polyvinyl acetate, cellulose and cellulose derivatives such as hydroxyethyl cellulose, polyvinyl pyrrolidone and copolymers thereof, polyethylene oxide, salts of polyacrylic acid, sodium alginate, starch and starch derivatives, Na alginate, polyethylene imine, polyvinylpyridinium halide, gelatines and gelatine derivatives such as phthaloyl gelatines, casein, vegetable gum, dextrin, albumin, dispersions and polyacrylates or acrylate/methacrylate copolymers, lattices of natural or synthetic rubber, poly(meth)acrylamide, polyvinyl ethers, polyvinyl esters, copolymers of maleic acid, melamine resins, urea resins, water soluble polyurethanes and polyesters, or the chemically modified polyvinyl alcohols disclosed in JP-A-61 134 290 or JP-A-61 134 291.

An additional dye receptor or a mordant which enhances the fixation of the dye to the coating may be added to the binder. Dye receptors for acid dyes are cationic or amphoteric. The cationic mordants can be soluble or dispersible in water. Exemplary cationic mordants are polymeric ammonium compounds such as polyvinylbenzyldi- or trialkylammonium compounds, optionally quaternized poly(di)allylammonium compounds, polymethacryloxyethyldimethylhydroxyethylammonium chloride, polyvinylbenzylmethylimidazolium chloride, polyvinylbenzylpicolinium chloride or polyvinylbenzyltributylammonium chloride. Further examples are basic polymers such as poly(dimethylaminoethyl)methacrylate, polyalkylenepolyamines and their condensation products with dicyanodiamide, amine/epichlorohydrin polycondensates or the compounds disclosed in JP-A-57-36692, 57-64591, 57-187289, 57-191084, 58-177390, 58-208357, 59-20696, 59-33176, 59-96987, 59-198188, 60-49990, 60-71796, 60-72785, 60-161188, 60-187582, 60-189481, 60-189482, 61-14979, 61-43593, 61-57379, 61-57380, 61-58788, 61-61887, 61-63477, 61-72581, 61-95977, 61-134291 or in U.S. Pat. Nos. 4,547,405 and 4,554,181 as well as in DE-A-3417582 and EP-B-609 930. The mordants used can also be compounds containing phosphonium groups (EP-B-609 930) as well as ground cationic ion exchange resins which are introduced in the mordant layer in a finely divided form. Further suitable cationic mordants are described in U.S. Pat. No. 6,102,997, pages 12 to 17. The cationic mordants can be soluble or dispersible in water and have an average molecular weight (weight average) of preferably at least 2,000 and, in particular, at least 20,000.

Besides the dye acceptor layer(s), the ink jet recording material might comprise other layers on the ink receiving side, which are intended, for example, for providing scratch resistance, absorbing water or controlling whiteness and/or glossiness. The backside of the substrate might also be coated with at least one binder layer, in order to prevent buckling of the recording material.

The ink jet recording material might also contain a number of other additives such as antioxidants, further light stabilizers (also including UV absorbers), viscosity improvers, fluorescent whitening agents, biocides, wetting agents, emulsifiers and spacers.

Suitable spacers are in particular spherical, have an average diameter of 1 to 50 μm, and in particular 5 to 20 μm, and have a narrow particle size distribution. Suitable spacers consist, for example, of polymethylmethacrylate, polystyrene, polyvinyl toluene, silicon dioxide and insoluble starch.

Illustrative examples of particularly suitable antioxidants are sterically hindered phenols, hydroquinones and hydroquinone ethers, for example the antioxidants disclosed in GB-A-2 088 777 or JP-A-60-72785, JP-A-0-72786 and JP-A-60-71796.

Illustrative examples of particularly suitable light stabilizers are organic nickel compounds and sterically hindered amines, for example the light stabilizers disclosed in JP-AA-58-152072, 61-146591, 61-163886, 60-72785 and 61-146591 or in EP 373 573, 685 345 and 704 316, GB-A-2 088 777, JP-A-59-169883 and 61-177279.

Suitable UV absorbers are disclosed, inter alia, in Research Disclosure No. 24239 (1984) page 284, 37254 part VIII (1995) page 292, 37038 part X (1995) page 85 and 38957 part VI (1996), GB-A-2 088 777, EP 280 650, EP 306 083 and EP 711 804. These compounds are preferably introduced into the layer(s) farthest from the support. In a particular embodiment, the UV absorbers are contained in a layer above the layer(s) containing the present stabilizers. Suitable UV absorbers for concurrent use with a present stabilizers in recording materials for ink jet printing are in particular those of the 2'-hydroxy-phenylbenzotriazole and 2'-hydroxyphenyltriazine class and, most particularly, 2-(2'-hydroxy-3',5'-di-tert-amylphenyl)benzotriazole and 2-(2'-hydroxy-3'-tert-butyl-5'-polyglycolpropionate-phenyl)benzotriazole. Further examples of particularly suited UV absorbers are listed in U.S. Pat. No. 6,102,997 pages 18–19. The UV absorbers can be soluble or insoluble in water and added to the coating composition as dispersion or emulsion, optionally together with high-boiling solvents, using suitable dispersing agents or emulsifiers. Suitable high boiling solvents are described in Research Disclosure No. 37254 part VIII (1995) page 292.

Suitable UV absorbers for concurrent use with a present sterically hindered N-hydroxylamine salt or a dialkyl N-hydroxylamine salt in recording materials for ink jet printing are for example hydroxyphenylbenzotriazoles, the tris-aryl-s-triazines, the benzophenones, the α-cyanoacrylates, the oxanilides, the benzoxazinones, the benzoates and the α-alkyl cinnamates.

For example, the UV absorber is a hydroxyphenylbenzotriazole, a tris-aryl-s-triazine or a benzophenone.

Typical and useful UV absorbers are, for example, 5-chloro-2-(2-hydroxy-3,5-di-tert-butylphenyl)-2H-benzotriazole;

2-(2-hydroxy-3,5-di-tert-butylphenyl)-2H-benzotriazole;

2-(2-hydroxy-3,5-di-tert-amylphenyl)-2H-benzotriazole;

2-(2-hydroxy-3,5-di-α-cumylphenyl)-2H-benzotriazole;

2-(2-hydroxy-3-α-cumyl-5-tert-octylphenyl)-2H-benzotriazole;

2-(2-hydroxy-5-tert-octylphenyl)-2H-benzotriazole;

2-(2-hydroxy-5-methylphenyl)-2H-benzotriazole;

2-(2-hydroxy-3-tert-butyl-5-methylphenyl)-2H-benzotriazole-5-sulfonic acid, sodium salt;

3-tert-butyl-4-hydroxy-5-(2H-benzotriazol-2-yl)-hydrocinnamic acid;

12-hydroxy-3,6,9-trioxadodecyl 3-tert-butyl-4-hydroxy-5-(2H-benzotriazol-2-yl)-hydro-cinnamate;

octyl 3-tert-butyl-4-hydroxy-5-(2H-benzotriazol-2-yl)-hydrocinnamate;

2-(3-t-butyl-2-hydroxy-5-(2-(ω-hydroxy-octa-(ethyleneoxy)carbonyl-ethyl)-phenyl)-2H-benzotriazole;

4,6-bis(2,4-dimethylphenyl)-2-(4-octyloxy-2-hydroxyphenyl)-s-triazine;

2,4-bis(2-hydroxy-4-butyloxyphenyl)-6-(2,4-bis-butyloxyphenyl)-1,3,5-triazine;

2-[4-(dodecyloxy/tridecyloxy-2-hydroxypropoxy)-2-hydroxyphenyl]-4,6-bis(2,4-dimethylphenyl) 1,3,5-triazine;

the reaction product of tris(2,4-dihydroxyphenyl)-1,3,5-triazine with the mixture of α-chloropropionic esters (made from isomer mixture of $C_7$–$C_9$alcohols);

2,4-dihydroxybenzophenone;

2,2',4,4'-tetrahydroxy-5,5'-disulfobenzophenone, disodium salt;

2-hydroxy-4-octyloxybenzophenone;

2-hydroxy-4-dodecyloxybenzophenone;

2,4-dihydroxybenzophenone-5-sulfonic acid and salts thereof;

2-hydroxy-4-methoxybenzophenone-5-sulfonic acid and salts thereof;

2,2'-dihydroxy-4,4'dimethoxybenzophenone-5,5'-disodium sulfonate;

3-(2H-benzotriazol-2-yl)-4-hydroxy-5-sec-butylbenzenesulfonic acid, sodium salt; and 2-(2'-hydroxy-3'-tert-butyl-5'-polyglycolpropionate-phenyl)benzotriazole.

The ink jet ink or ink jet recording material may contain singlet oxygen quenchers, for example 1,4-diazabicyclo[2.2.2]octane (DABCO), or salts thereof, for example the HCl salt of DABCO.

The binders in the individual layers, and in particular gelatines, can also be crosslinked by suitable compounds, so-called hardening agents, in order to improve the water and scratch resistance of the layers. Suitable hardening agents are described in Research Disclosure No. 37254 part IX (1995) page 294, 37038 part XII (1995) page 86 and 38957 part IIB (1996) page 599 et seq. The hardening agents are normally used in quantities of 0.005 to 10% by weight, and preferably 0.01 to 1% by weight, based on the binder to be hardened.

The ink jet recording material can be produced in one pass from the support material and a casting solution for each layer to be applied, by means of a cascade or curtain casting device of the kind known from the production of photographic silver halide materials. After the casting solution(s) has/have been cast on the support, the material is dried and is then ready for use. The individual layers have a dry layer thickness of 0.1 to 20 μm, and preferably 0.5 to 5 μm.

The present stabilizers can be dissolved either directly in the ink or coating composition or added thereto in the form of an emulsion or suspension. As already mentioned, the present stabilizers can be also applied to the recording material in a separate operation, alone or together with other already described components, as a solution in water or in a suitable organic solvent. Application can be made by spraying, by sizing in a sizing press, by a separate coating operation or by immersion in a vat. After subjecting the recording material to such an after treatment, an additional drying step is necessary.

The invention is illustrated by the following non-limitative examples.

The following stabilizers are tested in examples.

A N,N-diethylhydroxylamine

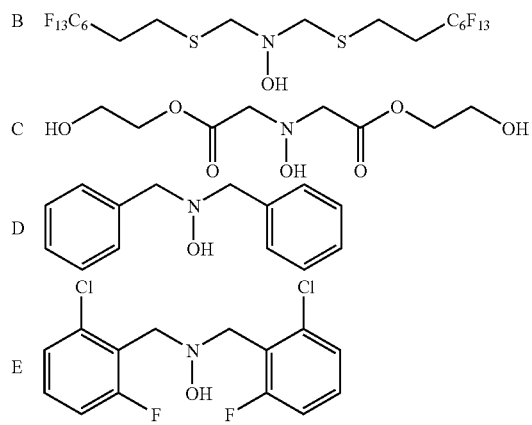

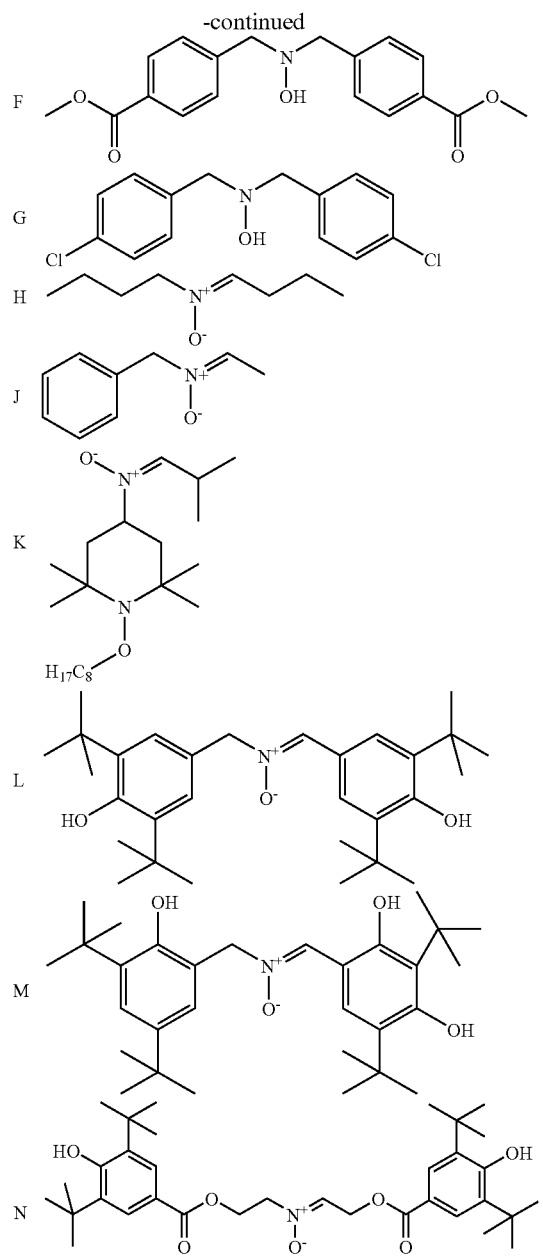

Compound A is purchased from Aldrich Chemical Co., Milwaukee, Wis.

Compounds B and C are prepared according to J. E. Baldwin, *Tetrahedron,* 1984, 40(21), 4363–70.

Compounds D, E, F, G are prepared according to U.S. Pat. No. 4,668,727.

Compound K is prepared according to U.S. Pat. Nos. 4,972,009 and 5,202,441.

Compounds H, J, L, M, N are prepared according to U.S. Pat. No. 4,898,901.

O The hydroxylamine prepared by direct hydrogen peroxide oxidation of bis(hydrogenated tallow alkyl) amines, that is N,N-di(hydrogenated tallow)hydroxylamine, CAS# 143925-92-2.

P A stabilizer mixture which is 7% by weight stabilizer 0, 28% by weight of Tinuvine® 328, 28% by weight of Tinuvine® 770, and 37% by weight of Chimassorbe 944.

As determined by thin layer chromatography, the mixture contains 0.34% by weight of the nitrone of bis(hydrogenated tallow alkyl) amines and 0.23% by weight of the oxime of bis(hydrogenated tallow alkyl) amines.

Q A stabilizer mixture which is 12.5% by weight stabilizer O, 37.5% by weight of Tinuvin® 770, and 50% by weight of Chimassorb® 944. As determined by thin layer chromatography, the mixture contains 0.61% by weight of the nitrone of bis(hydrogenated tallow alkyl) amines and 0.41% by weight of the oxime of bis(hydrogenated tallow alkyl) amines.

R A stabilizer mixture which is 50% by weight of stabilizer O and 50% by weight of Tinuvine® 622. As determined by thin layer chromatography, the mixture contains 2.45% by weight of the nitrone of bis(hydrogenated tallow alkyl) amines and 1.65% by weight of the oxime of bis(hydrogenated tallow alkyl) amines.

S GenoX™ EP, a di($C_{16}$–$C_{18}$)alkyl methyl amine oxide, CAS# 204933-93-7, GE Chemicals.

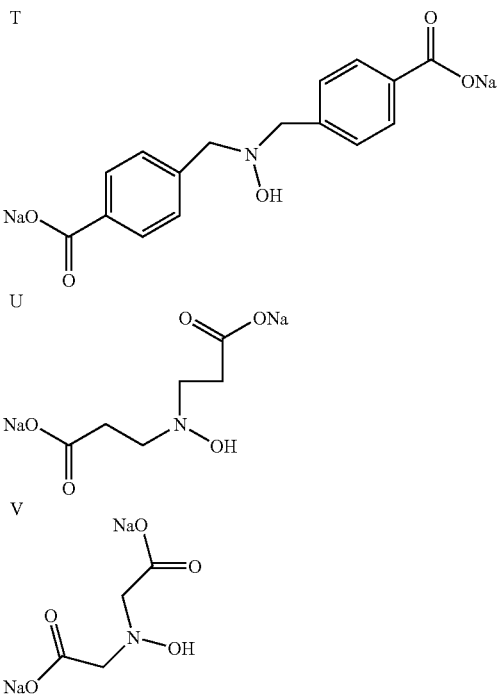

Stabilizer O, N,N-di(hydrogenated tallow)hydroxylamine, is prepared as in the working Examples of U.S. Pat. No. 5,013,510.

Stabilizers T, U and V are prepared according to U.S. Pat. No. 4,668,727.

Tinuvine® 770, Chimassorb® 944 and Tinuvine® 622 are hindered amine light stabilizers (HALS) and are bis(2,2,6,6-tetramethyl-4-piperidyl)sebacate; the condensate of N,N'-bis(2,2,6,6-tetramethyl-4-piperidyl)hexamethylenediamine and 4-tert-octylamino-2,6-dichloro-1,3,5-triazine and the condensate of 1-(2-hydroxyethyl)-2,2,6,6-tetramethyl-4-hydroxypiperidine and succinic acid, respectively.

Tinuvin® 328 is a hydroxyphenylbenzotriazole ultraviolet (UV) light absorber, 2-(3,5-di-tert-amyl-2-hydroxyphenyl)-2H-benzotriazole.

Tinuvin® and Chimassorb® are trademarks of Ciba Specialty Chemicals, Tarrytown, N.Y.

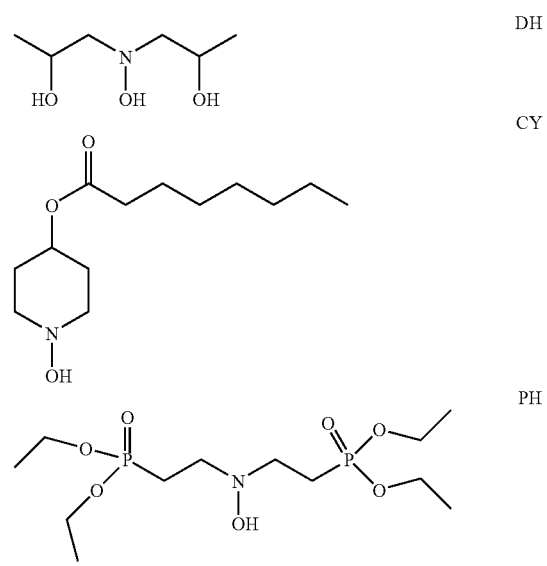

Compounds DH, CY and PH are made by methods known in the art, according to methods described in U.S. Patents discussed herein.

A blank entry in the Examples means the experiment was not performed.

EXAMPLE 1

A resin-coated paper impregnated with inorganic adsorbent particles (Konica QP Photoglossy ink jet paper, Konica Corp.) is purchased. On the ink-receiving layer, a 0.8 wt % methanol solution, unless stated otherwise, of the instant compounds is applied in an amount to achieve 650–700 mg/m². The paper is allowed to dry under ambient temperature and pressure for 24 hours. Separately, test patterns (magenta and yellow) are printed on the treated sheets using a Hewlett Packard DeskJet 970 Cxi printer at 100% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting. The change in color is given by Delta E (DE) which is calculated by:

$$DE=[(DL^*)^2+(Da^*)^2+(Db^*)^2]^{1/2}$$

| | DE after 4 weeks | |
|---|---|---|
| Stabilizer | magenta | yellow |
| None | 12.12 | 5.40 |
| B | 9.61 | 1.99 |
| C | 8.09 | 3.83 |

The compounds according to this invention clearly improve the light fastness of ink jet prints.

EXAMPLE 2

A resin-coated paper impregnated with inorganic adsorbent particles (Konica QP Photoglossy ink jet paper, Konica Corp.) is purchased. On the ink-receiving layer, a 0.8 wt % methanol solution, unless stated otherwise, of the instant compounds is applied in an amount to achieve 650–700 mg/m². The paper is allowed to dry under ambient temperature and pressure for 24 hours. Separately, test patterns (cyan, magenta, and yellow) are printed on the treated sheets using a Hewlett Packard DeskJet 970 Cxi printer at 50% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting.

|            | DE after 4 weeks |         |        |
|------------|------------------|---------|--------|
| Stabilizer | cyan             | magenta | yellow |
| None       | 5.84             | 12.06   | 6.02   |
| A          | —                | 10.63   | 5.61   |
| B          | 3.12             | 11.74   | 2.00   |
| C          | —                | 6.39    | 5.72   |

As the above data show, compounds according to this invention are able to improve clearly the light fastness of ink jet prints.

EXAMPLE 3

A resin-coated paper impregnated with inorganic adsorbent particles (Konica QP Photoglossy ink jet paper, Konica Corp.) is purchased. On the ink-receiving layer, a 0.8 wt % methanol solution, unless stated otherwise, of the instant compounds is applied in an amount to achieve 650–700 mg/m². The paper is allowed to dry under ambient temperature and pressure for 24 hours. Separately, test patterns (cyan, magenta, and yellow) are printed on the treated sheets using a Hewlett Packard DeskJet 970 Cxi printer at 100% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting.

|            | DE after 4 weeks |         |        |
|------------|------------------|---------|--------|
| Stabilizer | cyan             | magenta | yellow |
| None       | 5.34             | 12.12   | 5.40   |
| D          | 4.12             | 11.06   | 1.30   |
| E          | 3.28             | 1.31    | 4.71   |
| F          | 3.22             | 6.26    | 1.31   |
| G          | 2.05             | 5.32    | 1.58   |

As the above data show, compounds according to this invention are able to improve clearly the light fastness of ink jet prints.

EXAMPLE 4

A resin-coated paper impregnated with inorganic adsorbent particles (Konica QP Photoglossy ink jet paper, Konica Corp.) is purchased. On the ink-receiving layer, a 0.8 wt % methanol solution, unless stated otherwise, of the instant compounds is applied in an amount to achieve 650–700 mg/m². The paper is allowed to dry under ambient temperature and pressure for 24 hours. Separately, test patterns (cyan, magenta, and yellow) are printed on the treated sheets using a Hewlett Packard DeskJet 970 Cxi printer at 50% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting.

|            | DE after 4 weeks |         |        |
|------------|------------------|---------|--------|
| Stabilizer | cyan             | magenta | yellow |
| None       | 5.34             | 12.06   | 6.02   |
| D          | 4.31             | 7.53    | 4.44   |
| E          | 5.60             | 11.54   | 4.73   |
| F          | —                | 11.83   | 4.59   |
| G          | 5.35             | —       | 4.82   |

As the above data show, compounds according to this invention are able to improve clearly the light fastness of ink jet prints.

EXAMPLE 5

A resin-coated paper impregnated with inorganic adsorbent particles (Konica QP Photoglossy ink jet paper, Konica Corp.) is purchased. On the ink-receiving layer, a 0.8 wt % methanol solution, unless stated otherwise, of the instant compounds is applied in an amount to achieve 650–700 mg/m². The paper is allowed to dry under ambient temperature and pressure for 24 hours. Separately, test patterns (cyan, magenta, and yellow) are printed on the treated sheets using a Hewlett Packard DeskJet 970 Cxi printer at 100% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting.

|            | DE after 5 weeks |         |        |
|------------|------------------|---------|--------|
| Stabilizer | cyan             | magenta | yellow |
| None       | 19.49            | 73.52   | 16.34  |
| H          | 14.89            | 62.56   | —      |
| J          | 13.61            | 57.47   | 7.85   |
| K          | 11.75            | 61.81   | 8.70   |
| L          | 12.24            | 62.19   | 9.55   |
| M          | 14.23            | 58.07   | 5.50   |
| N          | 10.95            | 61.44   | 5.67   |

As the above data show, compounds according to this invention are able to improve clearly the light fastness of ink jet prints.

EXAMPLE 6

A resin-coated paper impregnated with inorganic adsorbent particles (Konica QP Photoglossy ink jet paper, Konica Corp.) is purchased. On the ink-receiving layer, a 0.8 wt % methanol solution, unless stated otherwise, of the instant compounds is applied in an amount to achieve 650–700 mg/m². The paper is allowed to dry under ambient temperature and pressure for 24 hours. Separately, test patterns (cyan, magenta, and yellow) are printed on the treated sheets using a Hewlett Packard DeskJet 970 Cxi printer at 50% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting.

| | DE after 5 weeks | | |
|---|---|---|---|
| Stabilizer | cyan | magenta | yellow |
| None | 18.59 | 48.32 | 13.68 |
| H | — | 45.77 | — |
| J | 18.07 | 44.80 | 10.14 |
| K | 17.57 | 45.25 | 10.12 |
| L | 16.76 | 45.66 | 10.05 |
| M | 16.59 | 42.52 | 8.05 |
| N | 15.84 | 42.90 | 4.23 |

As the above data show, compounds according to this invention are able to improve clearly the light fastness of ink jet prints.

EXAMPLE 7

A resin-coated paper impregnated with inorganic adsorbent particles (Konica QP Photoglossy ink jet paper, Konica Corp.) is purchased. On the ink-receiving layer, a 0.8 wt % methanol solution, unless stated otherwise, of the instant compounds is applied in an amount to achieve 650–700 mg/m$^2$. The paper is allowed to dry under ambient temperature and pressure for 24 hours. Separately, magenta test patterns are printed on the treated sheets using a Hewlett Packard DeskJet 970 Cxi printer at 50% print density. The obtained prints are left to dry at ambient temperature and pressure for 24 hours. Color densities and CIEL*a*b coordinates before and after exposure are measured using X-Rite 938 Spectrodensitometer. Exposures are stored in the dark for 5 weeks.

| Stabilizer | DE for magenta |
|---|---|
| None | 5.24 |
| J | 2.49 |
| L | 3.26 |
| M | 3.62 |

As the above data show, compounds according to this invention are able to improve clearly the dark storage stability of ink jet prints.

EXAMPLE 8

A resin-coated paper impregnated with inorganic adsorbent particles (Konica QP Photoglossy ink jet paper, Konica Corp.) is purchased. On the ink-receiving layer, a 0.8 wt % acetone solution of the instant compounds is applied, after being clarified to remove any insoluble particles, in an amount to achieve 650–700 mg/m$^2$. The paper is allowed to dry under ambient temperature and pressure for 24 hours. Separately, test patterns (cyan, magenta, and yellow) are printed on the treated sheets using a Hewlett Packard DeskJet 970 Cxi printer at 100% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting.

| | DE after 12 weeks | | |
|---|---|---|---|
| Stabilizer | cyan | magenta | yellow |
| None | 6.19 | 25.73 | 5.82 |
| O | 4.57 | 21.53 | 2.96 |
| P | 4.84 | 20.85 | 4.87 |
| Q | 4.64 | 19.16 | 5.54 |
| R | 4.48 | 20.41 | — |

The above data show that the compounds according to this invention are able to improve clearly the light fastness of ink jet prints.

EXAMPLE 9

A resin-coated paper impregnated with inorganic adsorbent particles (Konica QP Photoglossy ink jet paper, Konica Corp.) is purchased. On the ink-receiving layer, a 0.8 wt % acetone solution of the instant compounds is applied, after being clarified to remove any insoluble particles, in an amount to achieve 650–700 mg/m$^2$. The paper is allowed to dry under ambient temperature and pressure for 24 hours. Separately, test patterns (cyan and magenta) are printed on the treated sheets using a Hewlett Packard DeskJet 970 Cxi printer at 50% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting.

| | DE after 12 weeks | |
|---|---|---|
| Stabilizer | cyan | magenta |
| None | 7.29 | 20.16 |
| O | 6.19 | 18.29 |
| P | 5.94 | 18.01 |
| Q | 6.08 | 14.90 |
| R | 5.64 | 16.44 |

As the above data show, compounds according to this invention are able to improve clearly the light fastness of ink jet prints.

EXAMPLE 10

A resin-coated paper impregnated with inorganic adsorbent particles (Konica QP Photoglossy ink jet paper, Konica Corp.) is purchased. On the ink-receiving layer, a 0.8 wt % methanol solution, unless stated otherwise, of the instant compounds is applied in an amount to achieve 650–700 mg/m$^2$. The paper is allowed to dry under ambient temperature and pressure for 24 hours. Separately, test patterns (cyan, magenta, and yellow) are printed on the treated sheets using a Hewlett Packard DeskJet 970 Cxi printer at 50% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting.

| | DE after 12 weeks | | |
|---|---|---|---|
| Stabilizer | cyan | magenta | yellow |
| None | 7.29 | 20.16 | 4.68 |
| A/N | 6.34 | 19.08 | 2.51 |
| A/J | 5.09 | 12.58 | 1.78 |

Compound A is N,N-diethylhydroxylamine, purchased from Aldrich Chemical Co. Mixtures of stabilizers are in a 1:1 by weight ratio with the total stabilizer concentration added of 650–700 mg/m2.

As the above data show, compounds according to this invention are able to improve clearly the light fastness of ink jet prints.

EXAMPLE 11

A resin-coated paper impregnated with inorganic adsorbent particles (Konica QP Photoglossy ink jet paper, Konica Corp.) is purchased. On the ink-receiving layer, a 0.8 wt % methanol solution, unless stated otherwise, of the instant compounds is applied in an amount to achieve 650–700 mg/m$^2$. The paper is allowed to dry under ambient temperature and pressure for 24 hours. Separately, test patterns (cyan, magenta, and yellow) are printed on the treated sheets using a Hewlett Packard DeskJet 970 Cxi printer at 100% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting.

| | DE after 12 weeks | | |
|---|---|---|---|
| Stabilizer | cyan | magenta | yellow |
| None | 6.19 | 25.73 | 5.82 |
| A/N | 5.72 | 23.50 | 4.31 |
| A/J | 4.77 | 17.09 | 4.04 |

Compound A is N,N-diethylhydroxylamine, purchased from Aldrich Chemical Co. Mixtures of stabilizers are in a 1:1 by weight ratio with the total stabilizer concentration added of 650–700 mg/m2.

As the above data show, compounds according to this invention are able to improve clearly the light fastness of ink jet prints.

EXAMPLE 12

A resin-coated paper impregnated with inorganic adsorbent particles (Konica QP Photoglossy ink jet paper, Konica Corp.) is purchased. On the ink-receiving layer, a 0.8 wt % methanol solution of the instant compounds is applied in an amount to achieve 650–700 mg/m$^2$. The paper is allowed to dry under ambient temperature and pressure for 24 hours. Separately, test patterns (cyan, magenta and yellow) are printed on the treated sheets using a Hewlett Packard DeskJet 970 Cxi printer at 50% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting.

| Stabilizer | |
|---|---|
| | DE for cyan after 4 weeks |
| None | 5.84 |
| T | 4.88 |
| U | 2.59 |
| | DE for magenta after 4 weeks |
| None | 12.06 |
| V | 8.39 |
| U | 4.68 |

As the above data show, compounds according to this invention are able to improve clearly the color fastness of ink jet prints.

Examples 1–12 are repeated with the amine oxide stabilizer S, with excellent results.

EXAMPLE 13

An ink-jet ink is prepared by dissolving 2 g of dye in 20 g of diethylene glycol and 78 g of deionized water. The dye used is Acid red 52. The instant stabilizers are weighed in an amount of 0.15 g into a test tube and dissolved in 2.85 g of ink. The obtained ink is filtered and transferred into an emptied and carefully cleaned cartridge of a Deskjet 510 printer (Hewlett-Packard). A stepped image is then printed onto plain paper (sihl+eika). The produced print is left to dry at 50° C. under vacuum for two hours and thereafter irradiated behind a 5 mm thick window glass in an Atlas Ci-35 light fading device equipped with a Xenon lamp. The Atlas device is operated at 43° C., 50%RH without dark cycles and the light intensity is 461 W/m$^2$ (300–800 nm). The color density of each step is measured before and after exposure using a MacBeth TR 924 densitometer. The compounds A–V according to this invention are able to improve substantially the light fastness of the ink-jet print.

EXAMPLE 14

Magenta and Yellow inks are extracted from an Hewlett-Packard three-color cartridge (HP C1823D). The instant stabilizers are weighed in an amount of 0.15 g into a test tube and dissolved in 2.85 g of either the magenta or yellow ink. The obtained ink is filtered and transferred into an emptied and carefully cleaned cartridge of a Deskjet 510 printer (Hewlett-Packard). A stepped image is then printed onto plain paper (sihl+eika) or, alternatively, onto Premium Photo paper from Hewlett-Packard (item code C6040A). The produced print is left to dry at 50° C. under vacuum for two hours and thereafter irradiated behind a 5 mm thick window glass in an Atlas Ci-35 light fading device equipped with a Xenon lamp. The Atlas device is operated at 43° C., 50%RH without dark cycles and the light intensity is 461 W/m$^2$ (300–800 nm). The color density of each step is measured before and after exposure using a MacBeth TR 924 densitometer. The compounds A–V according to this invention are able to improve the light fastness of the magenta and yellow prints.

EXAMPLE 15

Canon PR-101 sheets (Canon Japan) are post-treated by casting stabilizer solutions, either aqueous or methanol, using a 75 micron wire wound coating bar. After drying at room temperature, the thus modified sheets are printed with cyan step images using a Canon BJC 8200 printer. The cyan dye used is C.I. Direct Blue 199. The obtained prints are left to dry at 50 C under vacuum for two hours and thereafter are subjected to forced airflow during four weeks. The color density is measured before and after exposure using a MacBeth TR 924 densitometer. The compounds A–V according to this invention are able to improve the light fastness of dyes when printed onto printing media.

EXAMPLE 16

The instant compounds A–V are each added to an ink composition, for example as disclosed in U.S. Pat. Nos. 5,855,655 or 5,782,963, at a concentration of 2 wt % and 0.5 wt % respectively. The images printed from these stabilized inks show reduced dye fading and better image permanence.

EXAMPLE 17

A commercial white polyethylene terephthalate sheet is coated with silica and polyvinylalcohol according to EP 1031431 A2 Example 1. A methanol solution of each of the instant compounds A–V is applied to this sheet in an amount equivalent to 400 mg/m$^2$. The image printed on this receiving layer shows reduced dye fading and better image permanence.

EXAMPLE 18

A commercial white polyethylene terephthalate sheet is coated with alumina hydrate and polyvinylalcohol according to EP 1031431 A2 Example 5. A methanol solution of each of the instant compounds A–V is applied to this sheet in an amount equivalent to 400 mg/m$^2$. The image printed on this receiving layer shows reduced dye fading and better image permanence.

EXAMPLE 19

A paper sheet containing alumina is prepared according to EP1031431 A2 Example 8. A methanol solution of each of the instant compounds A–V is applied to this sheet in an amount equivalent to 600 mg/m$^2$. The image printed on this receiving layer shows reduced dye fading and better image permanence.

EXAMPLE 20

A paper sheet containing silica is prepared according to U.S. Pat. No. 5,165,973. A methanol solution of the each of the instant compounds A–V is applied to this sheet in an amount equivalent to 700 mg/m2. The image printed on this receiving layer shows reduced dye fading and better image permanence.

EXAMPLE 21

A resin-coated paper impregnated with inorganic adsorbent particles (Konica QP Photoglossy ink jet paper, Konica Corp.) is purchased. On the ink-receiving layer, a 0.8 wt % methanol solution of each of the instant compounds A–V and a benzotriazole based UV absorber, is applied in an amount to achieve 650–700 mg/m$^2$. The UV absorber and the instant compounds are in a 2:1 ratio by weight. The paper is allowed to dry under ambient temperature and pressure for 24 hours. Separately, test patterns (cyan, magenta and yellow) are printed on the treated sheets using an Epson printer at 100% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting. The compounds according to this invention are able to improve clearly the light fastness of ink jet prints. The UV absorber is 3-(2H-benzotriazol-2-yl)-4-hydroxy-5-(1-methylpropyl)-benzenesulfonic acid monosodium salt.

EXAMPLE 22

A resin-coated paper impregnated with inorganic adsorbent particles (Konica QP Photoglossy ink jet paper, Konica Corp.) is purchased. On the ink-receiving layer, a 0.8 wt % methanol solution of each of the instant compounds A–V and a benzotriazole based UV absorber is applied in an amount to achieve 650–700 mg/m$^2$. The UV absorber and the instant compounds are in a 1:1 ratio by weight. The paper is allowed to dry under ambient temperature and pressure for 24 hours. Separately, test patterns (cyan, magenta and yellow) are printed on the treated sheets using a Hewlett Packard DeskJet 970 Cxi printer at 50% print density. The obtained prints are left to dry at ambient temperature and pressure for 24 hours. Color densities and CIEL*a*b coordinates before and after exposure are measured using X-Rite 938 Spectrodensitometer. Exposures are carried out using UV lamps. The compounds according to this invention are able to improve clearly the light fastness of ink jet prints. The UV absorber is the transesterification product of 2-[3'-tert-butyl-5'-(2-methoxycarbonylethyl)-2'-hydroxyphenyl]-2H-benzotriazole with polyethylene glycol 300.

EXAMPLE 23

A resin-coated paper impregnated with inorganic adsorbent particles (Konica QP Photoglossy ink jet paper, Konica Corp.) is purchased. On the ink-receiving layer, a 0.8 wt % methanol solution of each of the instant compounds A–V and a benzotriazole based UV absorber, is applied in an amount to achieve 650–700 mg/m$^2$. The UV absorber and the instant compounds are in a 1:1 ratio by weight. The paper is allowed to dry under ambient temperature and pressure for 24 hours. Separately, test patterns (cyan, magenta and yellow) are printed on the treated sheets using a Hewlett Packard DeskJet 970 Cxi printer at 100% print density. The obtained prints are left to dry at ambient temperature and pressure for 24 hours. Color densities and CIEL*a*b coordinates before and after exposure are measured using X-Rite 938 Spectrodensitometer. Exposures are carried out using normal office fluorescent lighting. The compounds according to this invention are able to improve clearly the light fastness of ink jet prints. The UV absorber is 3-(2H-benzotriazol-2-yl)-4-hydroxy-5-(1-methylpropyl)-benzenesulfonic acid monosodium salt.

EXAMPLE 24

A resin-coated paper impregnated with inorganic adsorbent particles (Konica QP Photoglossy ink jet paper, Konica Corp.) is purchased. On the ink-receiving layer, a 0.8 wt % methanol solution of the instant compounds is applied in an amount to achieve 650–700 mg/m$^2$. The paper is allowed to dry under ambient temperature and pressure for 24 hours. Separately, test patterns (cyan, magenta and yellow) are printed on the treated sheets using a Hewlett Packard DeskJet 990 Cxi printer at 50% and 100% print density. The obtained prints are left to dry at ambient temperature and pressure for 24 hours. Color densities and CIEL*a*b coordinates before and after exposure are measured using X-Rite 938 Spectrodensitometer. Percent OD (optical density) loss is reported. Exposures are carried out using normal office fluorescent lighting. The compounds according to this invention are able to improve clearly the color fastness of ink jet prints.

| Stabilizer | 100% print density | 50% print density |
|---|---|---|
| % OD loss for magenta after 4 weeks | | |
| None | 70 | 62 |
| DH | 53 | 49 |
| CY | 43 | 50 |
| PH | 39 | 50 |
| % OD loss for cyan after 4 weeks | | |
| None | 36 | 40 |
| DH | 17 | 22 |
| CY | 18 | 31 |
| PH | 15 | 29 |
| % OD loss for yellow after 4 weeks | | |
| None | 14 | 21 |
| DH | 8 | 16 |
| CY | 7 | 10 |
| PH | 10 | 13 |

What is claimed is:

1. An ink jet ink comprising at least one compound selected from the group consisting of
   a) the dialkyl hydroxylamine stabilizers and
   b) the nitrone stabilizers or
   an ink jet system comprising a recording material and at least one colored ink to be applied to the recording material by means of an ink jet nozzle, wherein the recording material or the at least one colored ink comprises at least one compound selected from the group consisting of
   a) the dialkyl hydroxylamine stabilizers and
   b) the nitrone stabilizers
where the dialkyl hydroxylamine stabilizers are selected from the group consisting of N,N-dibenzylhydroxylamine, N,N-dimethylhydroxylamine, N,N-bis(2-hydroxypropyl) hydroxylamine, N,N-bis(3-hydroxypropyl)hydroxylamine, N,N-bis(2-carboxyethyl)hydroxylamine, N,N-bis(benzylthiomethyl)-hydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine. N-hexadecyl-N-octadecylhydroxylamine, N-heptadecyl-N-octadecylhydroxylamine, N-methyl-N-octadecylhydroxylamine, N,N-di(hydrogenated tallow)hydroxylamine,

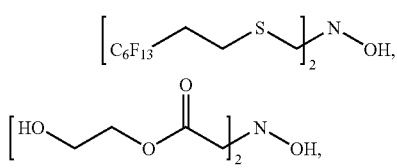

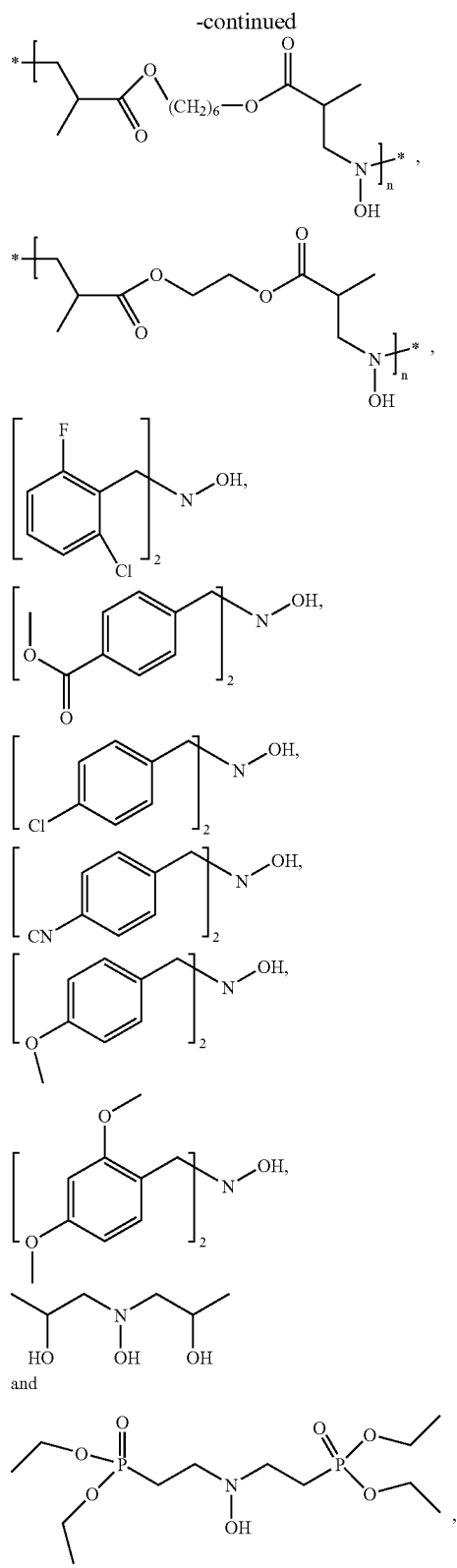

where n=2 to 200.

2. An ink jet ink or ink jet system according to claim 1 which comprises at least one compound selected from the group consisting of the dialkyl hydroxylamine stabilizers.

3. An ink jet ink or ink jet system according to claim 2 where the dialkyl hydroxylamine stabilizers are N,N-bis(2-hydroxypropyl)hydroxylamine, N,N-bis(3-hydroxypropyl)hydroxylamine, N,N-dibenzylhydroxylamine or N,N-di(hydrogenated tallow)hydroxylamine.

4. An ink jet ink or ink jet system according to claim 1 which comprises at least one compound selected from the group consisting of the nitrone stabilizers.

5. An ink jet ink or ink jet system according to claim 4 where the nitrone stabilizers are of the formula

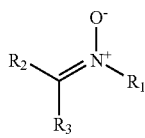

wherein $R_1$ is alkyl of 1 to 36 carbon atoms, cycloalkyl of 5 to 12 carbon atoms or aralkyl of 7 to 9 carbon atoms; or $R_1$ is said alkyl, cycloalkyl or aralkyl substituted by one to six alkyl of 1 to 12 carbon atoms, perfluoroalkyl of 1 to 12 carbon atoms, halogen, cyano, $E_1O$—, $E_1CO$—, $M^+O^-CO$—, $E_1OCO$—, $E_1COO$—, $E_1S$—, $E_1SO$—, $E_1SO_2$—, —$NH_2$, —$NHE_1$, —$NE_1E_2$, —$PO(OE_1)(OE_2)$ or —$OPO(OE_1)(OE_2)$ groups;

$R_2$ is hydrogen or independently has the same meaning as $R_1$; or $R_1$ and $R_2$ together form a $C_{2-12}$heterocyclic ring which is unsubstituted or is substituted by one to three three alkyl of 1 to 12 carbon atoms, perfluoroalkyl of 1 to 12 carbon atoms, halogen, cyano, $E_1O$—, $E_1CO$—, $M^+O^-CO$—, $E_1OCO$—, $E_1COO$—, $E_1S$—, $E_1SO$—, $E_1SO_2$—, —$NH_2$, —$NHE_1$, —$NE_1E_2$, —$PO(OE_1)(OE_2)$ or —$OPO(OE_1)(OE_2)$ groups; or where said $C_{2-12}$heterocyclic ring is interrupted by one to three —O—, —$NE_1$—, —CO—, —$CONE_1$—, —S—, —SO—, —$SO_2$—, —COO—, —$PO_3$— or —$PO_4E_1$ groups; or where said heterocyclic ring is both substituted and interrupted by said groups;

$M^+$ is a mono, di- or tri-valent metal cation;

$E_1$ and $E_2$ independently are hydrogen, alkyl of 1 to 8 carbon atoms or alkyl of 1 to 8 carbon atoms substituted by one to three hydroxyl groups; or $E_1$ and $E_2$ independently are an oligomer of poly(ethylene glycol) or poly(propylene glycol) terminated by hydroxyl, methoxy, acetate or propionate, where the oligomer has a molecular weight up to about 500; and $R_3$ independently has the same meaning as $R_1$; or the nitrones are of the formula

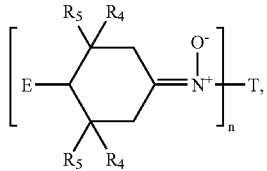

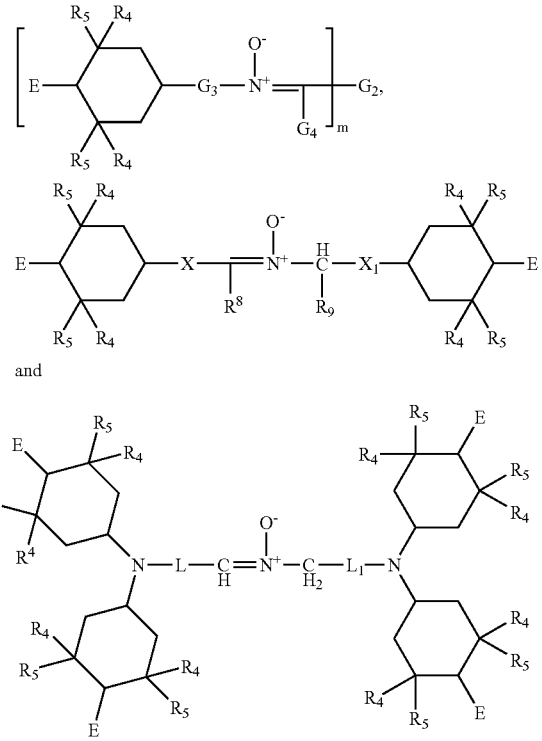

and wherein

E is hydrogen, oxyl, hydroxyl, alkyl of 1 to 18 carbon atoms, alkenyl of 3 to 18 carbon atoms, cycloalkyl of 5 to 12 carbon atoms, hydroxyalkyl of 2 to 6 carbon atoms, alkoxyalkyl of 2 to 20 carbon atoms, alkanoyl of 1 to 18 carbon atoms, alkoxy of 1 to 18 carbon atoms, cycloalkoxy of 5 to 12 carbon atoms, aryloxy of 6 to 10 carbon atoms, hydroxyalkoxy of 2 to 6 carbon atoms, alkoxyalkoxy of 2 to 20 carbon atoms, aralkoxy of 7 to 15 carbon atoms or a bicyclo or tricycloaliphatic oxy radical of 7 to 12 carbon atoms, $R_4$ and $R_5$ are independently alkyl of 1 to 4 carbon atoms or together $R_3$ and $R_4$ are pentamethylene, n is 1, 2, 3 or 4, when n is 1, T is alkyl of 1 to 36 carbon atoms, cycloalkyl of 5 to 12 carbon atoms, aralkyl of 7 to 9 carbon atoms or aralkyl of 7 to 9 carbon atoms substituted by alkyl of 1 to 4 carbon atoms or by one or two halogen atoms, said alkyl interrupted by one or more oxygen atoms, cyanoethyl, alkenyl of 3 to 8 carbon atoms, alkoxycarbonylalkyl of 4 to 36 carbon atoms where alkyl is of 1 to 4 carbon atoms, when n is 2, T is alkylene of 2 to 12 carbon atoms, arylene of 6 to 10 carbon atoms, xylylene, —$CH_2CHOHCH_2$—, —$CH_2CHOHCH_2$—O—$G_1$—O—$CH_2CHOHCH_2$—, —$CH_2$-phenylene-COO—$G_1$—OCO-phenylene-$CH_2$— or —$CH_2$-phenylene-$CH_2$—OCO—$G_1$—COO—$CH_2$-phenylene-$CH_2$—, $G_1$ is alkylene of 2 to 12 carbon atoms, arylene of 6 to 10 carbon atoms or cycloalkylene of 6 to 12 carbon atoms, when n is 3, T is alkanetriyl of 3 to 6 carbon atoms, or is

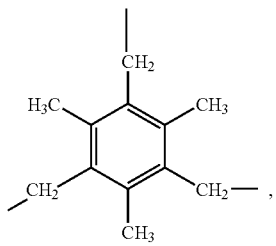

and when n is 4, T is alkanetetrayl of 4 to 6 carbon atoms, $G_3$ is a direct bond, —OCO($C_qH_{2q}$)$_q$—, —OCO-phenylene-$CH_2$—, —NG$_4$—CO—($C_qH_{2q}$)$_q$— or —NG$_4$—CO-phenylene-$CH_2$— where q is 1 to 12, $G_4$ is hydrogen, alkyl of 1 to 8 carbon atoms or phenyl, m is 1 or 2, when m is 1, $G_2$ is alkyl of 1 to 36 carbon atoms, said alkyl interrupted by one or more oxygen atoms, cyanomethyl, cycloalkyl of 6 to 8 carbon atoms, alkenyl of 2 to 8 carbon atoms, aryl of 6 to 10 carbon atoms, or aryl of 6 to 10 carbon atoms substituted by alkyl of 1 to 4 carbon atoms or by one or two halogen atoms, or alkoxycarbonylalkyl of 4 to 36 carbon atoms where alkyl is of 1 to 4 carbon atoms, and when m is 2, $G_2$ is alkylene of 2 to 12 carbon atoms or arylene of 6 to 10 carbon atoms, X and $X_1$ are independently Q—G, where Q is —O—, —COO—, —OCO— or —NR$_6$—, $R_6$ is hydrogen, alkyl of 1 to 8 carbon atoms, cycloalkyl of 5 to 12 carbon atoms, cyanoethyl, aryl of 6 to 10 carbon atoms, aralkyl of 7 to 15 carbon atoms or —CH$_2$CHR$_7$OH, and $R_7$ is hydrogen, methyl or phenyl, with Q being attached to the piperidinyl ring, G is alkylene of 1 to 4 carbon atoms, arylene of 6 to 10 carbon atoms or arylene-alkylene of 7 to 15 carbon atoms, $R_8$ and $R_9$ are independently hydrogen or alkyl of 1 to 8 carbon atoms, and L and $L_1$ are independently —CO-alkylene of 2 to 5 carbon atoms or —CO-phenylene-with the carbonyl group being attached to the N atom.

6. An ink jet ink or ink jet system according to claim 4 where the nitrone stabilizers are selected from the group consisting of N-benzyl-α-phenylnitrone, N-ethyl-α-methylnitrone, N-octyl-α-heptylnitrone, N-lauryl-α-undecylnitrone, N-tetradecyl-α-tridcylnitrone, N-hexadecyl-α-pentadecylnitrone, N-octadecyl-α-heptadecylnitrone, N-hexadecyl-α-heptadecylnitrone, N-ocatadecyl-α-pentadecylnitrone, N-heptadecyl-α-heptadecylnitrone, N-octadecyl-α-hexadecylnitrone, N-methyl-α-heptadecylnitrone, the nitrone derived from N,N-di(hydrogenated tallow)hydroxylamine, N-benzyl-α-methylnitrone, N-butyl-α-propylnitrone,

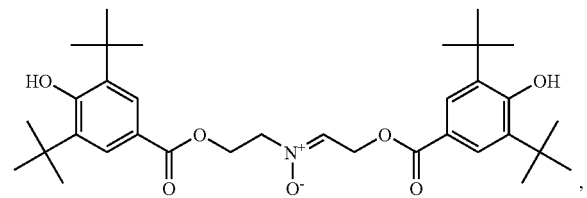

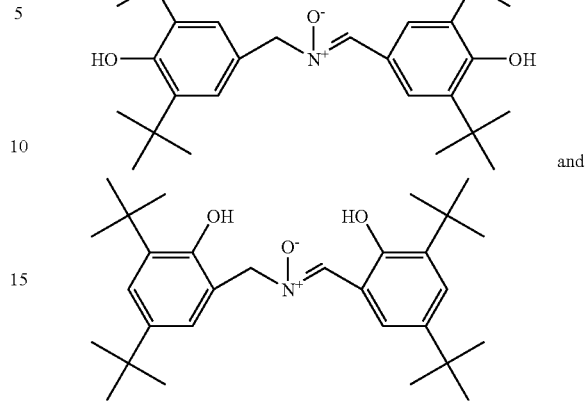

and

7. An ink jet ink or ink jet system according to claim 4 where the nitrone stabilizers are N-benzyl-α-phenylnitrone or N-ethyl-α-methylnitrone.

8. An ink jet ink or ink jet system according to claim 5 in which E is hydrogen, hydroxyl, alkyl of 1 to 12 carbon atoms, alkyl, benzyl, alkanoyl of 2 to 4 carbon atoms, alkoxy of 1 to 12 carbon atoms, cyclohexyloxy or alpha-methylbenzyloxy.

9. An ink jet ink or ink jet system according to claim 5 in which $R_4$ and $R_5$ are each methyl, when n is 1, T is hydrogen, alkyl of 1 to 18 carbon atoms, benzyl or alkoxycarbonylalkyl of 4 to 18 carbon atoms where the alkyl is of 2 to 4 carbon atoms, when n is 2, T is alkylene of 2 to 8 carbon atoms or is p-xylylene, when n is 3, T is glyceryl, when n is 4, T is pentaerythrityl, $G_3$ is a direct bond, $G_4$ is hydrogen, when m is 1, $G_2$ is alkyl of 1 to 12 carbon atoms or phenyl, when m is 2, $G_2$ is alkylene of 3 to 8 carbon atoms or phenylene, X and $X_1$ are the same, $R_8$ and $R_9$ are each hydrogen, and L and $L_1$ are the same and are —CO—OH$_2$— or —CO-phenylene-.

10. An ink jet ink or ink jet system according to claim 4 where the nitrone stabilizers are selected from the group consisting of α-phenyl-N-(2,2,6,6-tetramethylpiperidin-4-yl)nitrone, α-phenyl-N-(1,2,2,6,6-pentamethylpiperidin-4-yl)nitrone, α-phenyl-N-(1-cyclohexyloxy-2,2,6,6-tetramethylpiperidin-4yl)nitrone, α-phenyl-N-(1-octyloxy-2,2,6,6-tetramethylpiperidin-4yl)nitrone, α,α'-p-phenylene-N,N'-bis[(2,2,6,6-tetramethylpiperidin-4-yl)nitrone], N-benzyl-N-(1-cyclohexyloxy-2,2,6,6-tetramethylpiperidin-4-ylidene)amine-N -oxide, α-n-propyl-N-(1-cyclohexyloxy-2,2,6,6-tetramethylpiperidin-4-yl)nitrone, α-isopropyl-N-(1-octyloxy-2,2,6,6-tetramethylpiperidin-4-yl)nitrone, α,α'-tetramethylene-N,N'-bis[(1-octyloxy-2,2,6,6-tetramethylpiperidin-4-yl)nitrone], α-n -propyl-N-(1-acetyl-2,2,6,6-tetramethylpiperidin-4-yl)nitrone and α-[4-(1-cyclohexyloxy-2,2,6,6-tetramethylpiperidin-4-yloxycarbonyl)-phenyl]-N-[4-(1-cyclohexyloxy-2,2,6,6-tetramethyl-piperidin-4-yloxycarbonyl)benzyl]nitrone.

11. An ink jet ink or ink jet system according to claim 1 comprising
at least one compound selected from the group consisting of a) the dialkyl hydroxylamine stabilizers and at least one compound selected from the group consisting of b) the nitrone stabilizers.

12. An ink jet ink according to claim 1 which comprises about 0.01 to about 30% by weight of at least one compound selected from the group consisting of components a) and b), based on the weight of the ink jet ink.

13. An ink jet system according to claim 1, wherein the recording material comprises about 1 to about 10000 mg/m² of at least one compound selected from the group consisting of components a) and b).

14. An ink jet ink or ink jet system according to claim 1 further comprising a UV absorber selected from the group consisting of the hydroxyphenylbenzotriazoles, the tris-aryl-s -triazines, the benzophenones, the α-cyanoacrylates, the oxanilides, the benzoxazinones, the benzoates and the α-alkyl cinnamates.

15. An ink jet ink or ink jet system according to claim 1 further comprising a UV absorber selected from the group consisting of the hydroxyphenylbenzotriazoles, the tris-aryl-s -triazines and the benzophenones.

16. An ink jet ink or ink jet system according to claim 1 further comprising a UV absorber selected from the group consisting of
5-chloro-2-(2-hydroxy-3,5-di-tert-butylphenyl)-2H-benzotriazole;
2-(2-hydroxy-3,5-di-tert-butylphenyl)-2H-benzotriazole;
2-(2-hydroxy-3,5-di-tert-amylphenyl)-2H-benzotriazole;
2-(2-hydroxy-3,5-di-α-cumylphenyl)-2H-benzotriazole;
2-(2-hydroxy-3-α-cumyl-5-tert-octylphenyl)-2H-benzotriazole;
2-(2-hydroxy-5-tert-octylphenyl)-2H-benzotriazole;
2-(2-hydroxy-5-methylphenyl)-2H-benzotriazole;
2-(2-hydroxy-3-tert-butyl-5-methylphenyl)-2H-benzotriazole-5-sulfonic acid, sodium salt;
3-tert-butyl-4-hydroxy-5-(2H-benzotriazol-2-yl)-hydrocinnamic acid;
12-hydroxy-3,6,9-trioxadodecyl 3-tert-butyl-4-hydroxy-5-(2H-benzotriazol-2-yl)-hydro -cinnamate;
octyl 3-tert-butyl-4-hydroxy-5-(2H-benzotriazol-2-yl)-hydrocinnamate;
2-(3-t-butyl-2-hydroxy-5-(2-(ω-hydroxy-octa-(ethyleneoxy)carbonyl-ethyl)-phenyl)-2H -benzotriazole;
4,6-bis(2,4-dimethylphenyl)-2-(4-octyloxy-2-hydroxyphenyl)-s-triazine;
2,4-bis(2-hydroxy-4-butyloxyphenyl)-6-(2,4-bis-butyloxyphenyl)-1,3,5-triazine;
2-[4-(dodecyloxy/tridecyloxy-2-hydroxypropoxy)-2-hydroxyphenyl]-4,6-bis(2,4-dimethylphenyl)1,3,5-triazine;
the reaction product of tris(2,4-dihydroxyphenyl)-1,3,5-triazine with the mixture of α-chloropropionic esters (made from isomer mixture of $C_7$–$C_9$alcohols);
2,4-dihydroxybenzophenone;
2,2',4,4'-tetrahydroxy-5,5'-disulfobenzophenone, disodium salt;
2-hydroxy-4-octyloxybenzophenone;
2-hydroxy-4-dodecyloxybenzophenone;
2,4-dihydroxybenzophenone-5-sulfonic acid and salts thereof;
2-hydroxy-4-methoxybenzophenone-5-sulfonic acid and salts thereof;
2,2'-dihydroxy-4,4'dimethoxybenzophenone-5,5'-disodium sulfonate;
3-(2H-benzotriazol-2-yl)-4-hydroxy-5-sec-butylbenzenesulfonic acid, sodium salt; and
2-(2'-hydroxy-3'-tert-butyl-5'-polyglycolpropionate-phenyl)benzotriazole.

17. A process for stabilizing ink jet prints which comprises applying to a recording material for ink jet printing an ink composition comprising a water soluble dye or a solution of a dye in an organic solvent and at least one compound selected from the group consisting of
a) the dialkyl hydroxylamine stabilizers and
b) the nitrone stabilizers and
drying said recording material
where the dialkyl hydroxylamine stabilizers are selected from the group consisting of N,N-dibenzylhydroxylamine, N,N-dimethylhydroxylamine, N,N-bis(2-hydroxypropyl)hydroxylamine, N,N-bis(3-hydroxypropyl)hydroxylamine, N,N-bis(2-carboxyethyl)hydroxylamine, N,N-bis(benzylthiomethyl)-hydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine, N,N-di(hydrogenated tallow)hydroxylamine,

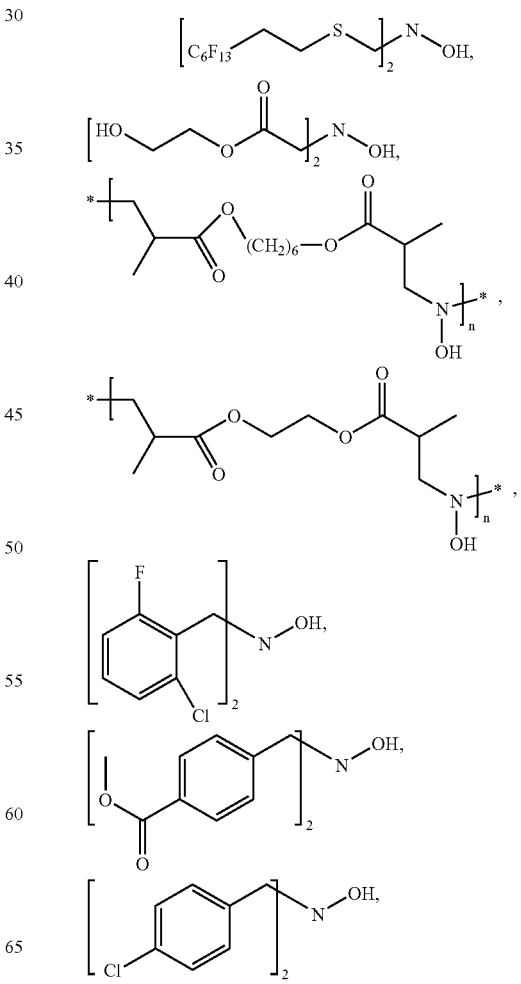

-continued

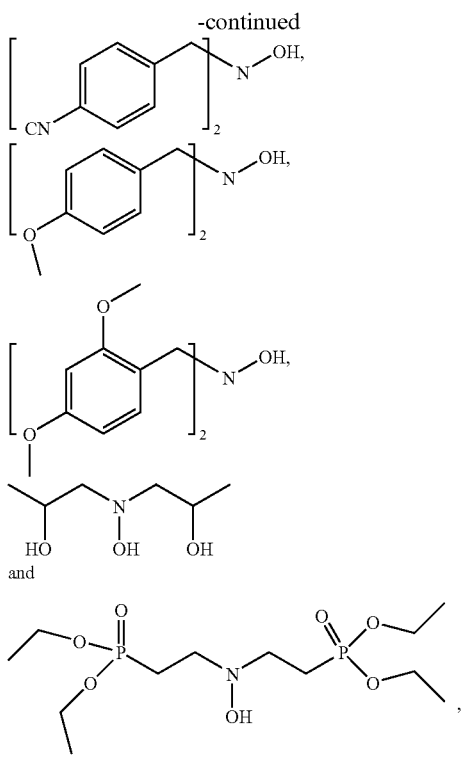

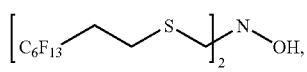

where n=2 to 200.

18. A process for stabilizing ink jet prints which comprises applying to a recording material for ink jet printing a casting or coating dispersion or an aqueous or organic solution comprising at least one compound selected from the group consisting of
   a) the dialkyl hydroxylamine stabilizers and
   b) the nitrone stabilizers and
further applying either an ink composition comprising a water soluble dye or a solution of a dye in an organic solvent; or an ink composition comprising a water soluble dye or a solution of a dye in an organic solvent and at least one compound selected from the group consisting of components a) and b) and drying said recording material
where the dialkyl hydroxylamine stabilizers are selected from the group consisting of N,N-dibenzylhydroxylamine, N,N-dimethylhydroxylamine, N,N-bis(2-hydroxypropyl) hydroxylamine, N,N-bis(3-hydroxypropyl)hydroxylamine, N,N-bis(2-carboxyethyl)hydroxylamine, N,N-bis(benzylthiomethyl)-hydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine, N,N-di(hydrogenated tallow)hydroxylamine, -continued

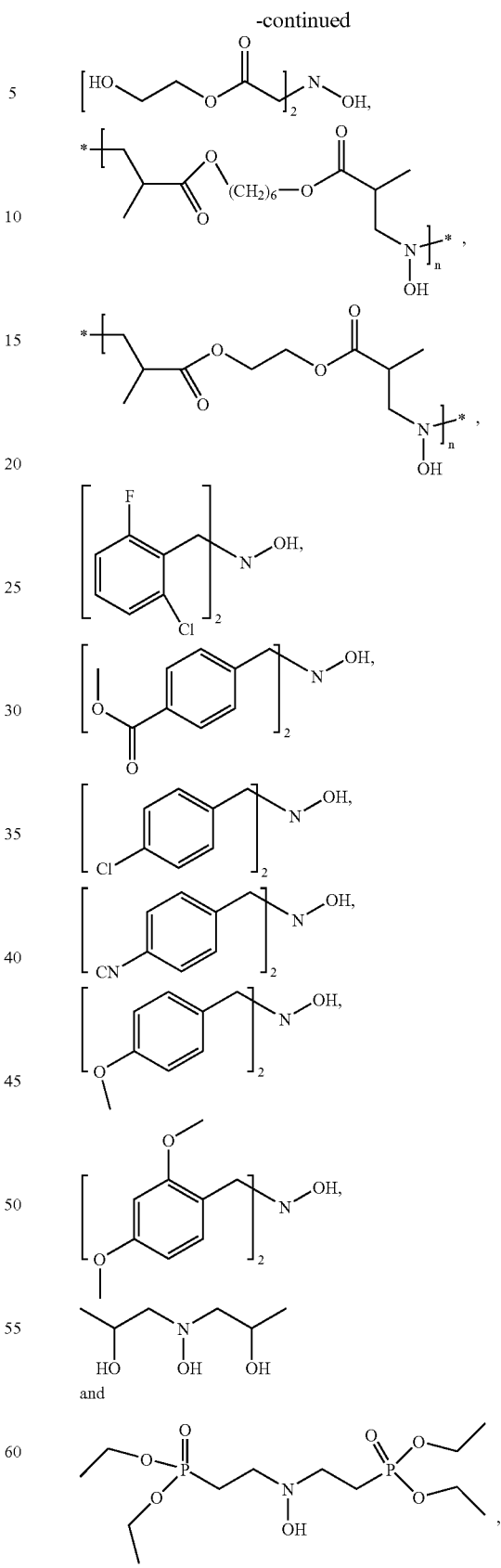

where n=2 to 200.

19. An ink jet recording material which is coated with at least one layer which is able to absorb ink, which at least one layer comprises at least one compound selected from the group consisting of
a) the dialkyl hydroxylamine stabilizers and
b) the nitrone stabilizers
where the dialkyl hydroxylamine stabilizers are of the formula $R_1 R_2 N-OH$ where $R_1$ is alkyl of 1 to 36 carbon atoms, cycloalkyl of 5 to 12 carbon atoms or aralkyl of 7 to 9 carbon atoms; or $R_1$ is said alkyl, cycloalkyl or aralkyl substituted by one to six alkyl of 1 to 12 carbon atoms, perfluoroalkyl of 1 to 12 carbons atoms, halogen, cyano, $E_1O-$, $E_1CO-$, $E_1COO-$, $E_1S-$, $E_1SO-$, $E_1SO_2-$, $-NH_2$, $-NHE_1-$, $-NE_1E_2$, $-PO(OE_1)(OE_2)$ or $-OPO(OE_1)(OE_2)$ groups;

$R_2$ is hydrogen or independently has the same meaning as $R_1$, where at least one of $R_1$ and $R_2$ contains a hydrogen alpha to the $-NOH$ moiety; and $E_1$ and $E_2$ independently are hydrogen, alkyl of 1 to 8 carbon atoms or alkyl of 1 to 8 carbon atoms substituted by one to three hydroxyl groups; or $E_1$ and $E_2$ independently are an oligomer of poly(ethylene glycol) or poly(propylene glycol) terminated by hydroxyl, methoxy, acetate or propionate, where the oligomer has a molecular weight up to about 500; and with the proviso that diethyl hydroxylamine is excluded.

20. An ink jet ink recording material according to claim 19 which comprises at least one compound selected from the group consisting of the dialkyl hydroxylamine stabilizers.

21. An ink jet recording material according to claim 20 where the dialkyl hydroxylamine stabilizers are selected from the group consisting of N,N-dibenzylhydroxylamine, N,N-dimethylhydroxylamine, N,N-bis(2-hydroxypropyl)hydroxylamine, N,N-bis(3-hydroxypropyl)hydroxylamine, N,N-bis(2-carboxyethyl)hydroxylamine, N,N-bis(benzylthiomethyl)hydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine, N,N-di(hydrogenated tallow)hydroxylamine,

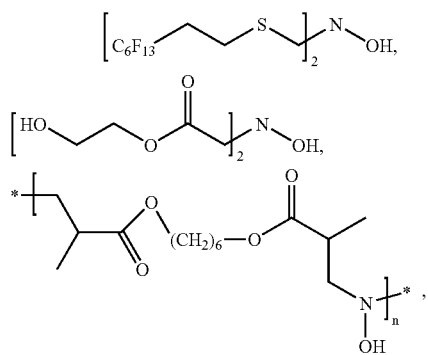

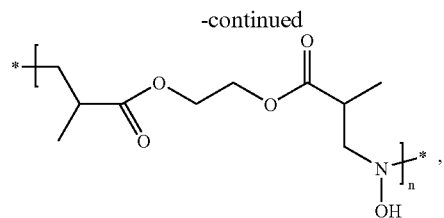

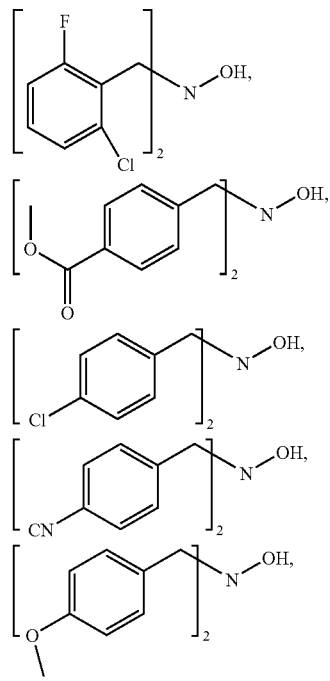

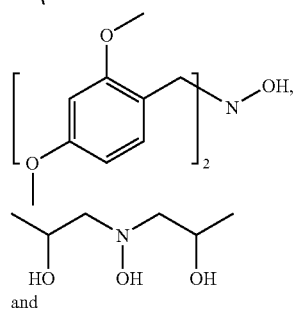

and

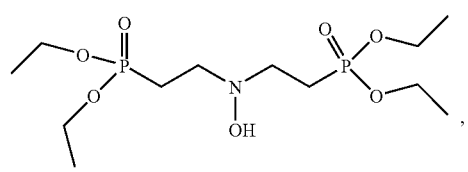

where n=2 to 200.

22. An ink jet recording material according to claim 19 which comprises at least one compound selected from the group consisting of the nitrone stabilizers.

23. An ink jet recording material according to claim 22 where the nitrone stabilizers are selected from the group consisting of N-benzyl-α-phenylnitrone, N-ethyl-α-methylnitrone, N-octyl-α-heptylnitrone, N-lauryl-α-undecylnitrone, N-tetradecyl-α-tridcylnitrone, N-hexadecyl-α-pentadecylnitrone, N-octadecyl-α-heptadecylnitrone, N-hexadecyl-α-heptadecylnitrone, N-ocatadecyl-α-pentadecylnitrone, N-heptadecyl-α-heptadecylnitrone, N-octadecyl-α-hexadecylnitrone, N-methyl-α-heptadecylnitrone, the nitrone derived from N,N-di(hydrogenated tallow)hydroxylamine, N-benzyl-α-methylnitrone, N-butyl-α-propylnitrone,

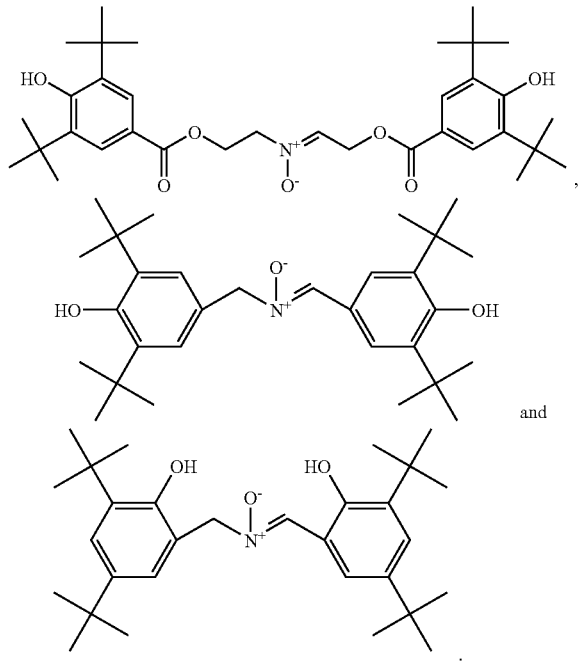

and

.

24. An ink jet recording material according to claim 22 where the nitrone stabilizers are selected from the group consisting of α-phenyl-N-(2,2,6,6-tetramethylpiperidin-4-yl)nitrone, α-phenyl-N-(1,2,2,6,6-pentamethylpiperidin-4-yl)nitrone, α-phenyl-N-(1-cyclohexyloxy-2,2,6,6-tetramethylpiperidin-4yl)nitrone, α-phenyl-N-(1-octyloxy-2,2,6,6-tetramethylpiperidin-4yl)nitrone, α,α'-p-phenylene-N,N'-bis[(2,2,6,6-tetramethylpiperidin-4-yl)nitrone], N-benzyl-N-(1-cyclohexyloxy-2,2,6,6-tetramethylpiperidin-4-ylidene)amine-N-oxide, α-n-propyl-N-(1-cyclohexyloxy-2,2,6,6-tetramethylpiperidin-4-yl)nitrone, α-isopropyl-N-(1-octyloxy-2,2,6,6-tetramethylpiperidin-4-yl)nitrone, α,α'-tetramethylene-N,N'-bis[(1-octyloxy-2,2,6,6-tetramethylpiperidin-4-yl)nitrone], α-n-propyl-N-(1-acetyl-2,2,6,6-tetramethylpiperidin-4-yl)nitrone and α-[4-(1-cyclohexyloxy-2,2,6,6-tetramethylpiperidin-4-yloxycarbonyl)-phenyl]-N-[4-(1-cyclohexyloxy-2,2,6,6-tetramethyl-piperidin-4-yloxycarbonyl)benzyl]nitrone.

25. An ink jet recording material according to claim 19 comprising
at least one compound selected from the group consisting of a) the dialkyl hydroxylamine stabilizers and at least one compound selected from the group consisting of b) the nitrone stabilizers.

26. An ink jet recording material according to claim 19 which comprises about 1 to about 10000 mg/m$^2$ of at least one compound selected from the group consisting of components a) and b).

27. An ink jet recording material according to claim 19 further comprising a UV absorber selected from the group consisting of the hydroxyphenylbenzotriazoles, the tris-aryl-s-triazines, the benzophenones, the α-cyanoacrylates, the oxanilides, the benzoxazinones, the benzoates and the α-alkyl cinnamates.

28. An ink jet recording material according to claim 19 further comprising a UV absorber selected from the group consisting of
5-chloro-2-(2-hydroxy-3,5-di-tert-butylphenyl)-2H-benzotriazole;
2-(2-hydroxy-3,5-di-tert-butylphenyl)-2H-benzotriazole;
2-(2-hydroxy-3,5-di-tert-amylphenyl)-2H-benzotriazole;
2-(2-hydroxy-3,5-di-α-cumylphenyl)-2H-benzotriazole;
2-(2-hydroxy-3-α-cumyl-5-tert-octylphenyl)-2H-benzotriazole;
2-(2-hydroxy-5-tert-octylphenyl)-2H-benzotriazole;
2-(2-hydroxy-5-methylphenyl)-2H-benzotriazole;
2-(2-hydroxy-3-tert-butyl-5-methylphenyl)-2H-benzotriazole-5-sulfonic acid, sodium salt;
3-tert-butyl-4-hydroxy-5-(2H-benzotriazol-2-yl)-hydrocinnamic acid;
12-hydroxy-3,6,9-trioxadodecyl3-tert-butyl-4-hydroxy-5-(2H-benzotriazol-2-yl)-hydro-cinnamate;
octyl 3-tert-butyl-4-hydroxy-5-(2H-benzotriazol-2-yl)-hydrocinnamate;
2-(3-t-butyl-2-hydroxy-5-(2-(ω-hydroxy-octa-(ethyleneoxy)carbonyl-ethyl)-phenyl)-2H-benzotriazole;
4,6-bis(2,4-dimethylphenyl)-2-(4-octyloxy-2-hydroxyphenyl)-s-triazine;
2,4-bis(2-hydroxy-4-butyloxyphenyl)-6-(2,4-bis-butyloxyphenyl)-1,3,5-triazine;
2-[4-(dodecyloxy/tridecyloxy-2-hydroxypropoxy)-2-hydroxyphenyl]-4,6-bis(2,4-dimethylphenyl)1,3,5-triazine;
the reaction product of tris(2,4-dihydroxyphenyl)-1,3,5-triazine with the mixture of α-chloropropionic esters (made from isomer mixture of C$_7$–C$_9$alcohols);
2,4-dihydroxybenzophenone;
2,2',4,4'-tetrahydroxy-5,5'-disulfobenzophenone, disodium salt;
2-hydroxy-4-octyloxybenzophenone;
2-hydroxy-4-dodecyloxybenzophenone;
2,4-dihydroxybenzophenone-5-sulfonic acid and salts thereof;
2-hydroxy-4-methoxybenzophenone-5-sulfonic acid and salts thereof;
2,2'-dihydroxy-4,4'dimethoxybenzophenone-5,5'-disodium sulfonate;
3-(2H-benzotriazol-2-yl)-4-hydroxy-5-sec-butylbenzenesulfonic acid, sodium salt; and
2-(2'-hydroxy-3'-tert-butyl-5'-polyglycolpropionate-phenyl)benzotriazole.

* * * * *